United States Patent
Chappell et al.

(10) Patent No.: US 12,211,325 B1
(45) Date of Patent: Jan. 28, 2025

(54) SYSTEM AND METHODS FOR MANAGING AND CONTROLLING A NETWORK OF DISTRIBUTED SERVICE UNITS

(71) Applicant: Quick Quack Car Wash Holdings, LLC, Roseville, CA (US)

(72) Inventors: Christopher Clinton Chappell, Lincoln, CA (US); Rodney Daniel Sparks, Antelope, CA (US); Dean Cameron Cable, Folsom, CA (US); Josh David Schumacher, Sacramento, CA (US); Lukas Duncan Simonis, Sacramento, CA (US); Joseph Allen Steele, III, Plumas Lake, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/638,095

(22) Filed: Apr. 17, 2024

(51) Int. Cl.
    *G07C 5/00*       (2006.01)
    *H04L 67/12*      (2022.01)

(52) U.S. Cl.
    CPC .............. *G07C 5/008* (2013.01); *H04L 67/12* (2013.01)

(58) Field of Classification Search
    CPC ............................... G07C 5/008; H04L 67/12
    See application file for complete search history.

(56) References Cited

U.S. PATENT DOCUMENTS

| 11,669,564 B2 * | 6/2023 | Martini | G06F 9/54 348/231.2 |
| 2012/0303645 A1 | 11/2012 | Kulkarni-Puranik | |
| 2021/0349482 A1 * | 11/2021 | Martin | G05B 15/02 |

FOREIGN PATENT DOCUMENTS

CN    109872132 A    6/2019

* cited by examiner

*Primary Examiner* — Michael V Kerrigan
(74) *Attorney, Agent, or Firm* — Caldwell Intellectual Property Law

(57) ABSTRACT

A system for managing and controlling a network of distributed service units, comprising service units, each includes sensors, each configured to detect operational parameters, and a secondary control unit configured to generate unstructured inputs containing digital signals related to the detected operational parameters, and a remote primary control unit communicatively connected to the secondary control units of the service units, wherein the remote primary control unit is configured to communicate with the secondary control units to receive the generated unstructured inputs, process the unstructured inputs by aggregating the unstructured inputs. The aggregation involves structuring the unstructured inputs to generate a structured data package. The remote primary control unit is further configured to transmit the structured data package to the secondary control units for a selective implementation of one or more operational adjustments based on the structured data package.

20 Claims, 8 Drawing Sheets

SYSTEM AND METHODS FOR MANAGING AND CONTROLLING A NETWORK OF DISTRIBUTED SERVICE UNITS

FIELD OF THE INVENTION

The present invention generally relates to the field of automated control systems. In particular, the present invention is directed to a system and methods for managing and controlling a network of distributed service units.

BACKGROUND

Complexity of managing and controlling distributed service units in service-oriented operations may stem from the need to handle vast amounts of data while maintaining system's operational efficiency, ensuring equipment reliability, and meet varying customer demands. One or the primary challenges in this domain is the effective management of diverse configurable data across a larger networked system. In some cases, system may range from automotive service system to manufacturing system that generate a substantial amount of data that needs to be processed and analyzed for an informed decision-making. However, the sheer volume and variety of such data, often unstructured and coming from multiple data sources, poses a significant difficulty in terms of processing and utilization.

SUMMARY OF THE DISCLOSURE

In an aspect, a system for managing and controlling a network of distributed service units is described. The system includes a plurality of service units, wherein each service unit of the plurality of service units includes a plurality of sensors, wherein each sensor of the plurality of sensors is configured to detect a plurality of operational parameters, and a secondary control unit communicatively connected to the plurality of sensors, wherein the secondary control unit is configured to generate a plurality of unstructured inputs containing a plurality of digital signals related to the plurality of operational parameters detected by the plurality of sensors. The system may further include a remote primary control unit communicatively connected to the secondary control units of the plurality of service units, wherein the remote primary control unit is configured to communicate with the secondary control units of the plurality of service units to receive the plurality of unstructured inputs, process the plurality of unstructured inputs by aggregating the plurality of unstructured inputs using a data aggregator and structuring the plurality of unstructured inputs to generate a structured data package, and transmit the structured data package to the secondary control units of the plurality of service units for a selective implementation of a plurality of operational adjustments based on the structured data package.

In another aspect, a method for managing and controlling a network of distributed service units is illustrated. The method includes detecting, using a plurality of sensors equipped at each service unit of the plurality of service units, a plurality of operational parameters, generating, using secondary control units at the plurality of service units, a plurality of unstructured inputs containing a plurality of digital signals related to the plurality of operational parameters detected by the plurality of sensors, communicating, by a remote primary control unit, with the secondary control units of the plurality of service units to receive the plurality of unstructured inputs, processing, by the remote primary control unit, the plurality of unstructured inputs by aggregating the plurality of unstructured inputs using a data aggregator and structuring the plurality of unstructured inputs to generate a structured data package, and transmitting, by the remote primary control unit, the structured data package to the secondary control units of the plurality of service units for a selective implementation of a plurality of operational adjustments based on the structured data package.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for managing and controlling a network of distributed service units. In an embodiment, system and methods as described herein may utilize a hierarchical control structure including primary and one or more secondary control units to facilitate dynamic and responsive operational adjustments based on structured data analysis. In some cases, said system may further include one or more tertiary control units communicatively connected to each secondary control unit.

Aspects of the present disclosure can be used to optimize operational processes across various service units by implementing data-driven decision-making leveraging a high-level API interaction between control units. Aspects of the present disclosure can also be used to enhance the reliability and maintenance of equipment through predictive analytics and proactive intervention strategies. This is so, at least in part, because the structured data packages and configuration categories may indicate one or more operational needs and facilitate timely and targeted responses at a secondary level of control.

Aspects of the present disclosure allow for a high degree of customization and adaptability in response to structured data package including system demands, and regulatory requirements. Exemplary embodiments illustrating aspects of the present disclosure are described below in the context of several specific examples.

Figure 1:
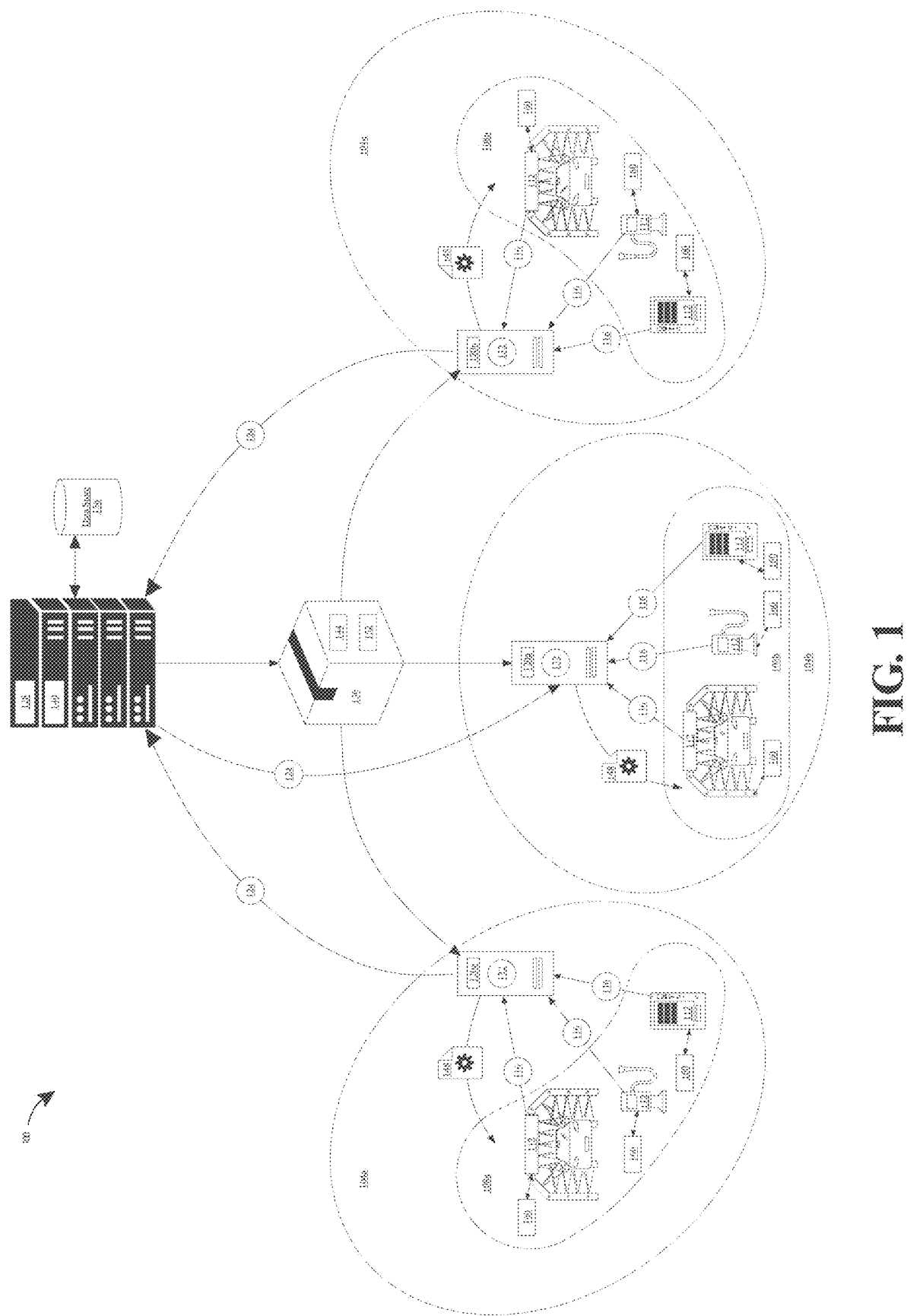
FIG. 1 is a schematic diagram illustrating an exemplary embodiment of a system for managing and controlling a network of distributed service units.

Now referring to FIG. 1, an exemplary embodiment of a system 100 for managing and controlling a network of distributed service units is illustrated. System 100 includes a plurality of service units 104, as used in this disclosure, "service units" are individual operational components or devices within a larger networked system, each designed to perform specific functions or services. In some cases, plurality of service units may be interconnected and collectively contribute to the overall functionality of a networked system, such as a car wash system as described in further detail below. In a non-limiting example, plurality of service units may include devices operated autonomously or semi-autonomously for providing a vehicle care. As used in this disclosure, a "vehicle care" is any activity, service, or feature that may be offered at a vehicle service site or in association with any vehicle services. Vehicle may include, without limitation, car, truck, buses, motorcycles, boats, airplane, and the like. A "vehicle care site," for the purpose of this disclosure, is a location or establishment that offers vehicle care 104. In a non-limiting example, vehicle service site may include a car wash site. In some cases, vehicle care site may be used interchangeably with "service area." In other cases, plurality of service units may include systems and devices across various other industries and application beyond vehicle service sites, for example, and without limitation, in manufacturing, system 100 as described herein may be used to manage and control a network of plurality of service units 104 e.g., automated manufacturing devices and robots deployed in multiple production lines. Additionally, or alternatively, in another non-limiting example, system 100 as descried herein may be applied to management of smart buildings, such as controlling various sub-systems e.g., HVAC (Heating, Ventilation, Air Conditioning), lighting, security, energy management and/or the like.

With continued reference to FIG. 1, in some cases, exemplary vehicle care may include, without limitation, a car washing service, a car vacuuming service. Activities offered at vehicle service site may include purchasing snacks or vehicle related products, manually operating one or more devices installed at vehicle service site such as, without limitation, plurality of vehicle care devices as described in further detail below, accessing utilities at vehicle service site (e.g., restrooms or other compartments/areas), and the like. In another non-limiting example, vehicle care 104 may further include vehicle maintenance services such as, oil change, tire rotation, brake inspection, air filter replacement, battery service, cooling system flush, transmission service, timing belt replacement, spark plug replacement, and the like at a vehicle service site such as an independent auto repair shop. As a person skilled in the art, upon reviewing the entirety of this disclosure, will be aware of various vehicle care that vehicle care site may provide.

With continued reference to FIG. 1, in an embodiment, plurality of service units may include one or more vehicle care devices 108. As used in this disclosure, "vehicle care devices" are a broad category of equipment, tools, or otherwise machines used to perform vehicle care as described above. In some cases, plurality of vehicle care devices 108 may be designed to help maintain the appearance, performance, and/or longevity of vehicles by addressing various aspects of vehicle care such as exterior cleaning, interior cleaning, maintenance tasks, and the like. in a non-limiting embodiment, plurality of vehicle care devices 108 may include a car wash equipment, wherein the car wash equipment is a device that are specifically designed to clean the exterior of a vehicle; for instance, and without limitation, plurality of vehicle care devices 108 may include a car wash unit (e.g., a car wash tunnel), an automated car wash system, a pressure washer, a foam applicator, and/or the like. In a non-limiting example, plurality of vehicle care devices 108 may include a multi-stage car wash system as described in U.S. patent application Ser. No. 18/637,290, filed on Apr. 16, 2024, and entitled "APPARATUS AND METHOD FOR A MULTI-STAGE CAR WASH", which its entirety is all incorporated herein by reference. In another non-limiting example, plurality of vehicle care devices 108 may also include a plurality of blowers for drying a vehicle as described in U.S. patent application Ser. No. 18/637,237, filed on Apr. 16, 2024, and entitled "SYSTEMS AND METHODS FOR DRYING A VEHICLE", which its entirety is all incorporated herein by reference.

With continued reference to FIG. 1, in a non-limiting embodiment, plurality of vehicle care devices 108 may include vehicle drying units, for example, a vacuum machine, wherein the vacuum machine is an equipment used for cleaning the interior of a vehicle. In a non-limiting example, vacuum machine may include a self-service vacuum machine, a commercial-grade vacuum cleaner designed for automotive use, and/or the like. In another non-limiting embodiment, plurality of vehicle care devices 108 may include a vending machine, wherein the vending machine is a machine that dispense various products; for instance, vending machine may be configured to dispense vehicle care products such as air fresheners, cleaning supplies, detailing tools, and the like. Such vending machine may allow users to conveniently purchase and apply these products to their vehicles. Other exemplary embodiments of vehicle care devices 108 may include, without limitation, waxing unit, tire inflation device, fluid dispensing machine, diagnostic and maintenance tools (e.g., code readers, battery testers, tire pressure monitoring systems, etc.,) and the like. As a person skilled in the art, upon reviewing the entirety of this disclosure, will be aware of various vehicle care devices may be employed by system 100 at different vehicle care site.

With continued reference to FIG. 1, each service unit of the plurality of service units 104 includes a plurality of sensors 112. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, pressure, flow rate, moisture level, acoustic vibrations, optical signals, electrical current, chemical composition, and the like, into a sensed signal such as a voltage with respect to a reference. In some cases, plurality of sensors 112 may detect a plurality of operational parameters 116 as described in detail below.

With continued reference to FIG. 1, as used in this disclosure, "operational parameters" are measurable and configurable factors or variables that define or influence the performance, efficiency, and functionality of each service unit of plurality of service units 104. In some cases, plurality of operational parameters 116 may include one or more physical measurements; for example, and without limitation, temperature, pressure, flow rates (e.g., water or air flow in a car wash system), speed, rotation (such as brush or wheel speeds), moisture levels, and/or the like. In some cases, plurality of operational parameters 116 detected by plurality of sensors 112 may include one or more values related to resource consumption. In an embodiment, parameters such as electricity consumption, water usage, or the use of any other consumables may be monitored. In some cases, plurality of operational parameters 116 may also include one or more quality indicators e.g., parameters that indicate the quality of vehicle service being performed, by one or more service units such as, without limitation, the consistency of a coating in a painting process or the cleanliness level in a washing process. In some cases, plurality of operational parameters 116 may include one or more sensed datums with respect to one or more environmental conditions. Such operational parameters may include, without limitation, ambient temperature, humidity, or other environmental factors that could potentially affect one or more operations of plurality of service units 104 in service area. In some cases, plurality of operational parameters 116 may additionally, or alternatively, include equipment health data. In a non-limiting example, parameters that indicate the condition of the equipment, such as battery status, vibration levels, wear and tear indicators, signs of potential malfunction, and/or the like. Such operational parameters 116 may further include one or more safety metrics and/or efficiency metrics, for example, and without limitation, parameters ensure operation is within safe limits (e.g., avoiding overheating, excessive pressure, or other hazardous conditions) and parameters that measure the efficiency of operations e.g., time taken for a process, energy efficiency, material utilization efficiency, among others.

With continued reference to FIG. 1, in some embodiments, plurality of sensors 112 such as, without limitation, temperature sensors (e.g., thermocouples, resistance temperature detectors [RTDs], infrared sensors, and/or the like), pressure sensors (e.g., piezoelectric sensors, strain gauge pressure sensors, capacitive pressure sensors, pressure transducers and/or the like), flow sensors (e.g., turbine flow meters, ultrasonic flow meters, electromagnetic flow meters, and/or the like), moisture or humidity sensors (e.g., capacitive moisture sensors, resistive moisture sensors, and/or the like), acoustic sensors (e.g., microphones, ultrasonic sensors, and/or the like), electrical sensors (e.g., ammeters, voltmeters, and/or the like), speed sensors (e.g., tachometers, hall effect sensors, and/or the like), rotation sensors (e.g., gyroscopes, rotary encoders, and/or the like), vibration sensors (e.g., accelerometers, seismometers, and/or the like), chemical sensors (e.g., gas sensors, pH sensors, and/or the like), proximity sensors (e.g., ultrasonic, capacitive, inductive sensors for detecting the presence or absence of objects), load cells, position sensors (e.g., linear variable differential transformers [LVDT], potentiometers, and/or the like), among others may be embedded in each service unit of plurality of service units 104.

With continued reference to FIG. 1, in some cases, plurality of sensors 112 may directly integral into machinery or equipment of each service unit of plurality of service units 104. For example, sensors such as temperature, pressure, and flow sensors may be directly integrated into one or more mechanical parts of service units e.g., (washing jects, drying units, and/or the like). In some cases, plurality of sensors 112 e.g., acoustic, vibration, moisture sensors may be surface mounted to each service unit of plurality of service units 104 where direct integration isn't feasible. Sensors for monitoring external operational parameters (e.g., environmental conditions) may be surface mounted to each service device of plurality of service units 104. In some cases, plurality of (wireless) sensors may be Bluetooth-enabled. In some cases, plurality of sensors may be portable or removable (for periodic monitoring or in situations where permanent installation is not required or desired). In some cases, plurality of sensors 112 e.g., environmental sensors that measuring ambient conditions may be placed around each service unit of plurality of service units 104. In some cases, plurality of sensors may be installed in-line with wires, pipes, or hoses. In some cases, one or more sensor arrays (i.e., array of different types of sensors working in tandem or individually) may be used to provide comprehensive monitoring simultaneously, for example, a combination of optical, acoustic, and pressure sensors used for monitoring a car wash system as described herein. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

With continued reference to FIG. 1, in one or more non-limiting embodiments, plurality of operational parameters 116 may include a plurality of engineering units pertaining to a corresponding vehicle care device, wherein the "plurality of engineering units," for the purpose of this disclosure, are standardized units of measurement used to quantify and express operational parameters of service unit (e.g., the corresponding vehicle care device) and system thereof. In some cases, engineering units may be configured in a consistent and universal manner to measure and communicate a plurality of physical quantities associated with one or more operations of machinery or equipment associated with plurality of service units 104. In a non-limiting example, plurality of operational parameters 116 may include one or more pressure (e.g., force exerted by water or air jet) measured in PSI or Pascals, flow rate measured in liters per minute or gallons per minute (indicating the volume of water or cleaning solution used), device temperature measured in degrees Celsius or Fahrenheit, speed of brushes or conveyors measured in revolutions per minute (RPM) or meters per second, electricity consumption measured in kilowatt-hours (kWh), among others. As a person skilled in the art, upon reviewing the entirety of this disclosure, will be aware of various operational parameters with appropriate engineering units, critical to functioning and efficiency of plurality of service units 104 that need to meticulously monitored, recorded, and processed for the generation of a structured data package as described in further detail below.

With continued reference to FIG. 1, additionally, or alternatively, plurality of operational parameters 116 may also include "external" operational parameters (i.e., factors that are not directly part of service unit's internal processes but [significantly] impact its performance or the quality of service such as vehicle care provided). In a non-limiting embodiment, such operational parameters may include sensed datums related to one or more environmental conditions as described above. In another non-limiting embodiment, such operational parameters may include a plurality of vehicle data. As used in this disclosure, "vehicle data" is information associated one or more vehicles interacting with one or more service units. Said vehicles may be in the service area (being serviced by the system 100) as described herein. In a non-limiting example, plurality of operational parameters 116 may include various vehicle data, such as vehicle dimensions (e.g., length, width, height), type (e.g., sedan, SUV, truck), color, surface condition, contamination level, specific areas requiring extra attention, custom requirements for the service, and/or the like. In some cases, vehicle data may be obtained through various means including, but not limited to manual input, scanning devices, RFID tags, or other sensor-based systems, and/or the like. In a non-limiting example, plurality of vehicle data may include any vehicle data, vehicle dimension data, vehicle profile, vehicle surface profile, and the like as described in U.S. patent application Ser. No. 18/195,597, filed on May 10, 2023, and entitled "APPARATUS AND METHOD FOR GENERATING A VEHICLE MAINTENANCE ACTIVITY," U.S. patent application Ser. No. 18/195,633, filed on May 10, 2023, and entitled "METHODS AND APPARATUSES FOR VEHICLE DIMENSIONING IN A CAR WASH," U.S. patent application Ser. No. 18/195,760, filed on May 10, 2023, and entitled "APPARATUS AND METHOD OF VEHICLE PROFILING," which enteritis are all incorporated herein by reference.

With continued reference to FIG. 1, in some cases, plurality of sensors 112 may also include, without limitation, an optical or image sensor such as a camera, a video camera, a photodiode, a photovoltaic cell, a photoconductive device, a thermal and/or infrared camera, photoelectric sensors, motion sensors, imaging devices, imaging sensors, and the like. In a non-limiting embodiment, plurality of sensors 112 may include one or more inductive loop sensors; for instance, and without limitation, the inductive loop sensors may include wires embedded in the road surface at the entry point and/or exit point of service area. When a vehicle passes over or stops above the loop, the metal in the vehicle alters the magnetic field, which the sensor detects. In some cases, plurality of sensors 112 may include contact or non-contact sensors. In a non-limiting embodiment, a sensor may include an ultrasonic sensor. An ultrasonic sensor may use sound waves to detect vehicles. When a vehicle passes, it interrupts the sound waves, and the change in echo pattern is detected. Additionally, or alternatively, plurality of sensors 112 may be used to visually or via light beams detect the presence and movement of vehicles. Further, vehicle data as described herein may include information related to vehicle's license plate or license plate numbers; for instance, and without limitation, plurality of service units 104 may include a plurality of image capturing devices configured to capture a plurality of vehicle images containing license plate region as disclosed in U.S. patent application Ser. No. 18/195,537, filed on May 10, 2023, entitled "APPARATUS AND METHOD FOR AUTOMATIC LICENSE PLATE RECOGNITION OF A VEHICLE," which is incorporated by reference herein in its entirety.

With continued reference to FIG. 1, in a non-limiting embodiment, plurality of sensors 112 may include a motion sensor. A "motion sensor," for the purposes of this disclosure, refers to a device or component configured to detect physical movement of an object or grouping of objects (i.e., Vehicle.) Exemplary motions may include, without limitation, spinning, rotating, oscillating, gyrating, jumping, sliding, reciprocating, driving, or the like. In such embodiment, a motion sensor may be configured to identify the speed and distance associated with the vehicle. In another non-limiting embodiment, a plurality of sensors 112 may include a LiDAR (Light Detection and Ranging) sensor. As used in the current disclosure, a "LiDAR sensor" is a device used for measuring distances and mapping environments. In some cases, a LIDAR sensor can be particularly effective in detecting and gathering vehicle data as described above. LiDAR may emit laser beams (or pulses of laser light) and then analyze the reflected light (and measure the time it takes for the light to return after hitting an object) to determine distances and create a digital 3D representation of the surrounding area. In a non-limiting example, a LiDAR sensor may detect the presence, size, and shape of vehicles within the service area. In some cases, LiDAR sensor may be configured to track the change in position of a vehicle over time; therefore, at least in part, LiDAR may accurately measure vehicle's speed. In an embodiment, detailed 3D images produced by LiDAR may allow for the differentiation between various types of vehicles (e.g., cars, trucks, motorcycles) based on size and shape. In some cases, LiDAR can be used to monitor and analyze traffic patterns within a vehicle care site, vehicle density, and flow rates on roads and highways nearby, among others. In some cases, LiDAR sensors may be used to create a map of the service area or vehicle's surroundings, including other vehicles, road boundaries, pedestrians, obstacles, and/or the like. In some embodiments, LiDAR may work in conjunction with other sensors as described herein, such as without limitation, like cameras, radar, and GPS.

With continued reference to FIG. 1, each service unit of the plurality of service units 104 includes a secondary control unit 120. As used in this disclosure, a "secondary control unit" is a localized controller or processor embedded within each individual service unit of the larger networked system. In one or more embodiment, secondary control unit 120 may include a control circuit, wherein the "control circuit," for the purpose of this disclosure, is an integrated circuit or a collection of interconnected circuits designed to manage, control, and/or interface with one or more functionalities of its respective service unit. In a non-limiting example, secondary control unit 120 may include any computing device as described in this disclosure, including without limitation a processor, a microcontroller, a microprocessor, a digital signal processor (DSP) and/or a system on a chip (SoC) that provide one or more services, resources, or data to other computing devices. In another non-limiting example, secondary control unit 120 may include a local server. Secondary control unit 120 may additionally, or alternatively, include, be included in, and/or communicate with a mobile device such as a mobile telephone or smartphone. Secondary control unit 120 may include a single computing device operating independently, or may include two or more computing device operating in concert, in parallel, sequentially or the like; two or more computing devices may be included together in a single computing device or in two or more computing devices. In some cases, secondary control unit 120 may include but is not limited to, for example, a computing device or cluster of computing devices in a first location and a second computing device or cluster of computing devices in a second location. In other cases, secondary control unit 120 may include a main unit or a primary circuit in a network that controls communications and/or provide a central point of interface.

With continued reference to FIG. 1, in a non-limiting embodiment, secondary control unit 120 may include a multi-core processor, wherein the "multi-core processor" is an integrated circuit that contains at least two cores on a single chip. In some cases, at least two processor cores may work simultaneously, allowing multiple tasks to be executed in parallel. A "core," for the purpose of this disclosure, is an individual processor unit within a larger processing unit (e.g., central processing unit [CPU] or graphics processing unit [GPU]). In some cases, "core" may be used interchangeably with the terminology "processor" in this disclosure. Each core of at least two cores may be capable of reading and/or executing one or more program instructions, performing arithmetic operations, managing data, and/or communicating with other secondary control units. In a non-limiting example, secondary control unit 120 may include a dual-core processor, quad-core processor, hexa-core processor, octa-core processor, many-core processor, or any processor that may perform simultaneous multi-threading (SMT) and/or dynamic core allocation. In some cases, secondary control unit 120 may include one or more integrated graphics cores. In some cases, secondary control unit 120 may include a cache architecture, wherein each core may include a private L1 (and in some cases, L2) cache, and all cores may share a larger L3 cache. In some cases, secondary control unit 120 may integrate at least two cores that are not identical, for example, and without limitation, a high-performance "heavy" core may be combined with an energy-efficient "lite" core. Secondary control unit 120 may choose the best core for a task based on power and/or performance needs.

With continued reference to FIG. 1, in some cases, secondary control unit 120 may implement a network-on-chip design. Secondary control unit 120 may interface or communicate with one or more additional devices as described below in further detail via a network interface device. Network interface device may be utilized for connecting secondary control unit 120 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

With continued reference to FIG. 1, a memory may be communicatively connected to the secondary control unit 120. A "memory," for the purpose of this disclosure, is a device used to store programs or data on a temporary or permanent basis for use in secondary control unit 120 or other computing devices as described herein. In some cases, memory may include a space for data to be read or written. In a non-limiting example, memory may include a random access memory (RAM). In some cases, RAM may include a dynamic RAM (DRAM) that stores each bit of data in a separate capacitor within secondary control unit 120 and being constantly refreshed to maintain the data. In other cases, RAM may include a static RAM (SRAM) that uses one or more flip-flops to store data (i.e., no need for refreshing). In one or more embodiments, memory may be read only (i.e., ROM). Data that is stored in ROM may be hard-wired and cannot be easily altered or re-written. In some cases, memory may retain data even after the power of secondary control unit 120 is turned off; however, in some cases, data within memory may be wiped and/or removed after secondary control unit 120 has been turned off and/or use of a particular software has been terminated. In some cases, memory may be programmable. In some cases, user may erase memory (with UV light) and reprogram memory. In some cases, memory may include a flash memory e.g., USB drive, memory card, solid-state drive (SSD), or the like. In some cases, memory may include cache memory, wherein secondary control unit 120 may store data used most often in the cache memory, thereby making it instantly available to speed up the secondary control unit 120. Other exemplary embodiments of memory may include, without limitation, magnetic memory (e.g., hard disk drive [HDD]), optical memory, magnetic tape memory, phase-change memory (PCM), ferroelectric RAM (FeRAM or FRAM), and the like. In some cases, secondary control unit 120 may include one or more computing devices dedicated to data storage, security, distribution of traffic for load balancing, and the like. In a non-limiting example, memory may include a secondary memory such as an HDD configured to be a long-term storage device in which an operating system and other information is stored. In some cases, data may be retrieved from secondary memory and transmitted to primary memory e.g., RAM during operation of secondary control unit 120.

With continued reference to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, secondary control unit 120 may distribute one or more computing tasks as described below across a plurality of computing devices of computing device, which may operate in parallel, in series, redundantly, or in any other manner used for distribution of tasks or memory between computing devices. Secondary control unit 120 may be implemented, as a non-limiting example, using a "shared nothing" architecture. In some cases, secondary control unit 120 may be designed and/or configured to perform any method, method step, or sequence of method steps in any embodiment described in this disclosure, in any order and with any degree of repetition. For instance, secondary control unit 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Secondary control unit 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, secondary control unit 120 is communicatively connected to plurality of sensors 112, wherein secondary control unit 120 may be configured to receive plurality of operational parameters 116 detected by plurality of sensors 112 as described above. In some cases, plurality of operational parameters 116 may be received in form of signals. As used in this disclosure, a "signal" is any intelligible representation of data, for example from one device to another. A signal may include an optical signal, a hydraulic signal, a pneumatic signal, a mechanical signal, an electric signal, a digital signal, an analog signal, and the like. In some cases, a signal may be used to communicate with a computing device, for example by way of one or more ports. In some cases, a signal may be transmitted and/or received by a computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

With continued reference to FIG. 1, secondary control unit 120 is configured to generate a plurality of unstructured inputs 124 containing a plurality of digital signals related to plurality of operational parameters 116 detected by plurality of sensors 112. As used in this disclosure, "unstructured inputs" are raw data or signals collected from various sources e.g., plurality of sensors 112 within each service unit that have not yet been organized or formatted for future processing as described in more detail below. In other cases, plurality of unstructured inputs 124 may come in other forms such as, without limitation, images, audio clips, video feeds, multimedia data, textural data, numerical measurements, and/or the like. In some cases, plurality of unstructured inputs 124 may not conform to a standard structure (e.g., schema or database table). In a non-limiting example, unstructured inputs 124 may include a continuous or discontinuous readings which may be characterized by one or more irregular intervals or formats. In some cases, unstructured inputs 124 may include a stream of data, such as, without limitation, real-time temperature measurements, pressure levels, energy usage, flow rates, where data may be captured and transmitted at regular, uninterrupted intervals. In other cases, unstructured inputs 124 may include data captured at irregular or sporadic intervals such as, without limitation, operational parameters or sensor data that is only recorded when certain conditions are met e.g., specific threshold being crossed, or an event being detected. Examples of discontinuous readings may include alarm triggers, irregular equipment usage logs, environmental changes, among others that only occasionally impact the plurality of service units' operations.

With continued reference to FIG. 1, in an embodiment, plurality of unstructured inputs 124 may be generated as a function of direct sensor output. In a non-limiting example, secondary control unit 120 may be configured to collect direct outputs from plurality of sensors 112 or other data collection device within system 100, wherein the direct outputs may reflect real-time or near-real0time conditions without any intermediate data processing or interpretation. In some cases, plurality of sensors 112 e.g., cameras and microphones may be installed in or around service units may generate unstructured inputs in form of images, video feeds, audio recordings, and/or the like. Additionally, or alternatively, plurality of unstructured inputs 124 may be generated as a function of one or more user inputs; for instance, and without limitation, operators or users interacting with one or more service units may input data e.g., text entries, selections, commands, and/or the like. In some cases, operational logs recorded one or more events, errors, or statuses may be used, by secondary control unit 120, in generating plurality of unstructured inputs. In a non-limiting example, plurality of unstructured inputs 124 may include a plurality of additional unstructured inputs, wherein the plurality of "additional unstructured inputs," for the purpose of this disclosure, are unstructured inputs not directly detected by plurality of sensors but accessible to secondary control unit 120. Exemplary additional unstructured inputs are described in more detail below.

With continued reference to FIG. 1, in some cases, secondary control unit 120 may be further configured to generate a plurality of additional unstructured inputs, such as, without limitation, user-generated data (e.g., manual entries, operator notes, feedback provided by operators or users interacting with service units, user interface interactions, and the like), external data source (e.g., information from outside immediate operational environment of service unit such as weather data, traffic conditions, market trends, supply chain information that not directly measured by internal sensors), system logs and error reports (e.g., a mix of text, codes, numerical data, and/or the like), network communications (e.g., data received from other units within the larger networked system or from remote primary control unit as described in detail below such as software updates, configuration commands, information shared between units, and the like), maintenance and service records (e.g., maintenance histories, servicing schedules, part replacements of service unit, and the like), access logs (e.g., authentication attempts), among other data that complement sensor-derived data (i.e., plurality of operational parameters 116) as described herein. As a person skilled in the art, upon reviewing the entirety of this disclosure, will be aware of various additional unstructured inputs that may be integral to plurality of unstructured inputs 124 as listed above.

With continued reference to FIG. 1, in a non-limiting example, plurality of additional unstructured inputs may include user activity data and user device data as described in U.S. patent application Ser. No. 18/196,238, filed on May 11, 2023, and entitled "APPARATUS AND METHOD FOR DATA CONVERSION", which its entirety is incorporated herein by reference. In another non-limiting example, plurality of additional unstructured inputs may include user data and membership tier as described in U.S. patent application Ser. No. 18/196,174, filed on May 11, 2023, and entitled "METHOD AND AN APPARATUS FOR A PERSONALIZED USER INTERFACE", which its entirety is incorporated herein by reference. In yet another non-limiting example, plurality of additional unstructured inputs may include system data and at least a (market) trend as described in U.S. patent application Ser. No. 18/196,371, filed on May 11, 2023, and entitled "APPARATUS AND METHOD FOR PROFILE ASSESSMENT", which its entirety is incorporated herein by reference. In a further non-limiting example, plurality of additional unstructured inputs may include user profiles and tokens as described in U.S. patent application Ser. No. 18/196,494, filed on May 12, 2023, and entitled "SYSTEM AND METHOD FOR PROVIDING A DYNAMIC USER EXPERIENCE IN A VEHICLE CARE", which its entirety is incorporated herein by reference.

With continued reference to FIG. 1, in some cases, generating plurality of unstructured inputs 124 may include performing a preliminary data processing on plurality of operational parameters 116. As described in this disclosure, a "preliminary data processing" is an initial operation or a set of initial operations or manipulations performed on plurality of operational parameters 116 detected by plurality of sensors and collected by secondary control unit 120 before plurality of operational parameters 116 or unstructured inputs 124 is further processed as described in further detail below. In an embodiment, secondary control unit 120 may perform one or more signal processing steps on plurality of signals. For instance, and without limitation, secondary control unit 120 may analyze, modify, and/or synthesize a signal representative of plurality of operational parameters 116 in order to improve the signal, for instance by improving transmission, storage efficiency, or signal to noise ratio. Exemplary methods of signal processing may include, without limitation, analog, continuous time, discrete, digital, nonlinear, and statistical as described in further detail below.

With continued reference to FIG. 1, in some cases, analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. In some cases, continuous-time signal processing may be used, in some cases, to process signals which varying continuously within a domain, for instance, time. Exemplary non-limiting continuous time processes may include time domain processing, frequency domain processing (Fourier transform), and complex frequency domain processing. In some cases, discrete time signal processing may be used when a signal is sampled non-continuously or at discrete time intervals (i.e., quantized in time). In an embodiment, analog discrete-time signal processing may process a signal using the following exemplary circuits sample and hold circuits, analog time-division multiplexers, analog delay lines and analog feedback shift registers. In some cases, digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). In an embodiment, digital signal processing may be used to perform any combination of typical arithmetical operations, including fixed-point and floating-point, real-valued and complex-valued, multiplication and addition. In another embodiment, digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. In some cases, statistical signal processing may be used to process a signal as a random function (i.e., a stochastic process), utilizing statistical properties. For instance, and without limitation, in some embodiments, a signal may be modeled with a probability distribution indicating noise, which then may be used to reduce noise in a processed signal.

With continued reference to FIG. 1, in some cases, preliminary data processing may include one or more data filtering operations to remove noise or irrelevant data from sensor readings, for example, and without limitation, secondary control unit 120 may be configured to refine a plurality of operational parameters 116 using one or more data filtering algorithms e.g., moving average filters, Kalman filters, low-pass filters, and/or the like. In some cases, preliminary data processing may include one or more data normalization operations (i.e., converting data into a common scale) and data formatting operations (e.g., converting analog signals to digital formats or encoding data) to facilitate a uniform analysis and integration of data (as described in further detail below) from diverse sources. In a non-limiting example, plurality of operational parameters 116 such as temperature (for water, air dryers, climate control in service area), pressure levels, flow rates (of water and cleaning solutions), chemical concentration (in detergents and waxes), moisture content (in drying areas), speed (of conveyor belts, brushes, blowers), rotation speed (for rotating brushes and scrubbers), electrical consumption (across all electrical devices, including lighting and automated machinery), water usage, vibration levels (in machinery), acoustic signals (from equipment), vehicle data, vehicle contamination level, transaction data (from point-of-sale [POS] systems), customer feedback (such as inputs from interactive kiosks or digital feedback systems), inventory levels (in vending machines and for consumables like detergents and waxes), air quality, lightings, device hardware and software information (including network connectivity), device usage patterns (of plurality of service units 104), current device configurations, service time and operational downtime, among others may be standardized and formatted by secondary control unit 120 for consistent processing across the network. In other cases, preliminary data processing may include data compression to reduce the size of received plurality of operational parameters for more efficient storage and transmission as described below. In a non-limiting example, secondary control unit 120 may be configured to implement downsampling techniques, which involves reducing the sampling rate of plurality of operational parameters, or using data compression algorithms e.g., ZIP or Run-Length Encoding (RLE) to minimize data volume without significant loss of information. Other exemplary embodiments of preliminary data processing operations may include, without limitation, time-stamping for chronological ordering, error detection and correction, and basic feature extraction to identify key data attributes. As a person skilled in the art, upon reviewing the entirety of this disclosure, will recognize the importance of these preliminary data processing steps in ensuring that plurality of operational parameters from plurality of sensors and/or additional inputs are accurate, consistent, and desirably formatted for subsequent processing and analysis within the system as described in further detail below.

With continued reference to FIG. 1, in a non-limiting embodiment, one or more service unit of plurality of service units having secondary control units may include an edge device. As used in this disclosure, an "edge device" is a component that is located closer to the source of data generation and/or collection and end-users within the larger networked system as described herein. Such proximity may allow for more immediate data processing and action. In a non-limiting example, edge device may process data (e.g., generate plurality of unstructured inputs 124) locally, instead of sending the data to a centralized data center or cloud for processing. In some cases, secondary control unit 120 may include advanced computational capabilities (e.g., onboard microprocessors, FPGA, and/or GPU acceleration) or specialized software algorithms (e.g., edge computing algorithms and/or machine learning algorithms) to reduce the physical distance data must travel, resulting in a lower latency and faster response times. Additionally, or alternatively, plurality of sensors 112 may include one or more wireless sensors and/or IoT (internet of things) devices. In a non-limiting example, wireless temperature sensors, pressure sensors, optical sensors and/or the like may be deployed across various parts of one or more service units to monitor plurality of operational parameters 116 in real-time as described above. These sensors, being part of IoT ecosystem at respective service site, may communicate data directly to edge device as described herein for immediate processing. For instance, and without limitation, edge device may include be consistent with any edge device as described in U.S. patent application Ser. No. 18/196,205, field on May 11, 2023, and entitled "SYSTEM AND METHOD FOR PROVIDING A SEAMLESS VEHICLE CARE AT A VEHICLE CARE SITE", which its entirety is incorporated herein by reference.

With continued reference to FIG. 1, system 100 also includes a remote primary control unit 128 communicatively connected to secondary control units 120 of plurality of service units 104. As used in this disclosure, a "remote primary control unit" is a centralized controller or computing system that oversees and coordinates operations of entire network of distributed service units, including those managed by individual secondary control units. In a non-limiting example, remote primary control unit may include any computing device as described herein. In some cases, remote primary control unit 128 may locate remotely from individual secondary control units. In a non-limiting example, remote primary control unit may be located in a central monitoring facility or a data center. In some cases, remote primary control unit may be located in a headquarter of a plurality of service sites. In a non-limiting example, secondary control unit 120 may be configured as a primary platform or base e.g., server that provides essential infrastructure, resources, and interfaces to facilitate the operation of other connected or integrated components, such as, without limitation, plurality of secondary control units and components managed by plurality of secondary control units as described herein. In some embodiments, remote primary control unit 128 may serve as a main communication hub for network. In some cases, remote primary control unit 128 may send one or more commands to and receiving data from plurality of secondary control units. In a non-limiting example, remote primary control unit may be responsible for updating software, managing configurations, deploying new algorithms or operational rules across plurality of service units.

With continued reference to FIG. 1, remote primary control unit 128 is configured to communicate with secondary control units 120 of plurality of service units 104 to receive plurality of unstructured inputs 124. System 100 as described herein may implement a master-slave configuration, wherein the "master-slave configuration," for the purpose of this disclosure, is a configuration model of asymmetric communication or control where one device or process e.g., remote primary control unit 128 (the master) controls one or more other devices or processes e.g., secondary control units 120 (the slaves). In a non-limiting example, remote primary control unit 128, functioning as a master device, may hold one or more central command and control responsibility for the entire network. For instance, remote primary control unit may aggregate and analyze data from all service units and make strategic decisions affecting the entire network as described in further detail below. This may include, but is not limited to, optimizing service units' operational efficiency, resource allocation, job scheduling, and/or the like. In some cases, remote primary control unit 128 may synchronize operations across all service units, for example, and without limitation, remote primary control unit 128 may be configured to send global commands and updates to plurality of secondary control units 120, which then implement these directives independently and locally.

With continued reference to FIG. 1, in some cases, each service unit of plurality of service units 104 in the network equipped with secondary control unit 120 may act as a slave to remote primary control unit 128. In some cases, secondary control unit 120 may be more localized and responsible for a direct control, including, without limitation, day-to-day operations, of their respective service unit. In some cases, secondary control unit 120 may be configured to receive and execute an instruction or a set of instructions from remote primary control unit 128. Exemplary instructions may include, without limitation, changes in one or more operational settings, execution of specific tasks, response to system-wide directives, and/or the like. In a non-limiting example, secondary control unit 120 may be associated with a geographic identifier 132. As used in this disclosure, a "geographic identifier" is a unique identifier or data attribute that links secondary control unit 120 to a specific geographic location, area, or zone. Such geographic identifier 132 may be used to determine the physical location of service unit within a larger networked system. In some embodiments, geographic identifier 132 may include GPS coordinates, RFID tags, location-specific barcodes, predefined zone codes within a facility, and/or the like. In some cases, geographic identifier 132 may be static, representing a fixed location, or in some cases dynamic, reflecting a movement of mobile service unit. In a non-limiting example, secondary control unit 120 may be configured to adjust corresponding service unit's operations based on geographic identifier 132. This means that secondary control unit 120 may modify behaviors, settings, or operational parameters of corresponding service unit when it is at a certain geographic location, or in other cases, one or more of service units of plurality of service units 104 that associated with a specific geographic identifier may receive commands or data from remote primary control unit 128 while the rest of plurality of service units 104 remain "uninformed."

With continued reference to FIG. 1, in some cases, master-slave configuration may include an implementation of bus mastering, wherein system 100 as described herein may include secondary control units 120, plurality of service units 104, and/or a primary control unit connected to a bus i.e., a communication system that controls the bus and initiate one or more transactions. In a non-limiting example, primary and secondary control units may communicate plurality of unstructured inputs over a shared bus, wherein the primary control unit (i.e., master) may have the capability to control the shared bus to communicate with secondary control units (i.e., slaves). In some cases, system 100 may perform one or more flexible single master operation, for example, the master role may be transferred or shared under certain conditions. Remote primary control unit 128 may be configured to dynamically assign control to one or more secondary control units under specific scenarios. In a non-limiting example, the control of communications may be shifted between different secondary control units depends on factors such as operational load, network connectivity, geographic identifier 132, or specific operational requirements. For instance, and without limitation, if remote primary control unit 128 current have bad network connectivity, at least one secondary control unit having a better connectivity or is currently less burdened, may be elected to temporarily take over as "master unit" to coordinate one or more activities among other of service units and/or secondary control units. In another non-limiting example, control may be shifted based on type of operation being performed. If a specific service unit equipped with advanced capabilities for a particular task (e.g., a specialized vehicle diagnostic system in a car wash), secondary control unit of such service unit may assume master control to manage related operations across the network more effectively.

With continued reference to FIG. 1, in one or more embodiments, remote primary control unit 128 may be configured to implement a master clock, wherein the "master clock," for the purpose of this disclosure, is a component that used to provide a timing signal to all secondary control units in the network. In some cases, a precise synchronization for example, and without limitation, a precise coordination of a plurality of operations across plurality of service units 104, a master clock may be implemented through various means. This may include, but is not limited to, a high-precision timekeeping device such as a GPS-based time serve as a source of the timing signal. In some cases, one or more timing signals may be distributed across secondary control unit through network time protocols such as NTP. In a non-limiting example, master clock may be configured to ensure that all service units in service area, such as, without limitation, conveyor belt, water jets, drying systems, POS terminals, operate in a coordinated manner. In some cases, remote primary control unit 128 may be configured to synchronize start and stop times of different operations or coordinating interactions between automated systems and human operators. Additionally, or alternatively, remote primary control unit 128 may be configured to perform a trusted time evaluation. In a non-limiting, a secure timestamp may be generated upon receipt of plurality of unstructured inputs 124. In some cases, generating the secure timestamp may include digitally signing the secure timestamp using any digital signature protocol as described herein. In one embodiment authenticity of received plurality of unstructured inputs may be established by utilizing a chain of attestation via one or more attestation schemes (in nonlimiting example, via direct anonymous attestation [DAA]) to verify that a data is authentic data that has the property of attested time.

With continued reference to FIG. 1, remote primary control unit 128 is configured to process plurality of unstructured inputs 124 by aggregating plurality of unstructured inputs 124, wherein aggregating plurality of unstructured inputs 124 includes structuring plurality of unstructured inputs 124 to generate a structured data package 136. As used in this disclosure, a "structured data package" is a collection of data that has been organized into a predefined format or schema, making it easier to store, process, transmit, and/or analyze. In an embodiment, such structuring process may transform the raw, unstructured inputs into a more usable and accessible form. In a non-limiting example, structuring process may include, without limitation, organization of data into tables, arrays, or other systematic formats that are conducive to analysis and decision-making. In some cases, structured data package 136 may be in various data format such as, without limitation, JavaScript Object Notation (JSON), extensible Markup Language (XML), Comma-Separated Values (CSV), or even SQL databases as described in further detail below. In a non-limiting example, structured data package may include a detailed current operational report and/or performance metrics associated with a secure timestamp. For instance, and without limitation, structured data package 136 may include a collection of data such as, without limitation, average water usage per wash, cycle times, chemical usage statistics, equipment efficiency rating, customer throughput rates, and/or the like.

With continued reference to FIG. 1, in one or more embodiment, structured data package 136 may be designed for an API-level interaction between the remote primary control unit and the secondary control units of the plurality of service units. As used in this disclosure, an "API-level interaction" is a mode of communication and data exchange that is facilitated through one or more Application Programming Interfaces (APIs), wherein APIs may provide a set of rules and protocols for building and interacting with one or more software applications within the system. In a non-limiting example, structured data package 136 may enable API-level interaction between remote primary control unit 128 and secondary control unit 120 by providing a standardized and well-defined format e.g., JSON, XML, or even a custom data format for data exchange. This ensures that both remote primary control unit 128 and secondary control units 120 may parse and understand structured data without ambiguity. In a non-limiting example, receiving unit of structured data package 136 e.g., secondary control units 120 may efficiently retrieve and process embedded data correctly by a data schema with defined data fields, types of data, hierarchical arrangement of the data, and/or the like. As a person skilled in the art, upon reviewing the entirety of this disclosure, will recognize how structured data package 136 may enable API-level interaction between remote primary control unit 128 and secondary control units 120 larger networked system as well as the benefits of enabling such interaction in interoperability, scalability, real-time responsiveness, security and integrity, case of maintenance and upgrades, data-driven decision making, among aspects of the system.

With continued reference to FIG. 1, in some cases, a data aggregator 140 is used to aggregate plurality of unstructured inputs 124 received from secondary control units 120. As used in this disclosure, a "data aggregator" is a system or software component designed to collect and combine diverse data streams. In an embodiment, data aggregator 140 may perform functions such as, without limitation, filtering, sorting, and merging data, as well as extracting key information and converting different data formats into one or more standardized form. In some cases, primary control unit may implement data aggregator 140 using one or more high-capacity data processing units or specialized data management systems designed to handle large volumes of data efficiently. In some cases, data aggregator may be configured to perform one or more preliminary analytics, for example, identifying trends as described in U.S. patent application Ser. No. 18/196,371. In some cases, data aggregator may be configured to perform one or more preliminary data processing as described above e.g., data filtering, cleaning, normalization, transformation, and/or the like. In some cases, data aggregator may be deployed in a cloud environment (leveraging the scalability and computational power of cloud computing), In a non-limiting example, primary control unit may deploy could services such as AWS, MICROSOFT AZURE, GOOGLE CLOUD, and the like to facilitate more robust data processing and data storage capabilities. Such data aggregator 140 may include a Software as a Service (SaaS) model, wherein data aggregation and processing software may be hosted on cloud platforms as listed above available through internet. In a non-limiting example, one or more third-party (cloud) service and data aggregator e.g., AWS LAMBDA, AMAZON S3, AMAZON REDSHIFT, AZURE FUNCTIONS, AZURE BLOB, AZURE SQL, BIGQUERY, among others may be integrated into the system via one or more APIs.

With continued reference to FIG. 1, in one or more embodiments, data aggregator 140 may implement one or more aspects of a cryptographic system. In some cases, data aggregator 140 may be configured to encode and/or decode plurality of unstructured inputs 124 and/or structured data package 136 at remote primary control unit 128. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in a non-limiting example, structuring plurality of unstructured inputs 124 may include transforming or in some cases, tabulating, using data aggregator 140 or converter, plurality of unstructured inputs 124 into rows and columns, creating one or more relational databases or database tables, structuring data into JSON or XML format for API consumptions as described in further detail below. For instance, and without limitation, plurality of operational parameters 116 e.g., sensor readings may be structured into a table with columns for time, sensor ID, reading type, and value. In some cases, structured data package 136 may include a plurality of data blocks or clusters, wherein the plurality of data blocks or clusters may represent a specific subset of aggregated plurality of unstructured inputs 124, organized logically or based on certain criteria. In a non-limiting example, remote primary control unit 128 may configure data aggregator 140 to perform one or more logical segmentation based on service unit type or function. In some cases, plurality of unstructured inputs 124 may be divided into blocks representing different types of service units or functions within the service site. For example, and without limitation, one data block within structured data package may contain data exclusively from washing units and another from drying units. In some cases, plurality of unstructured inputs 124 may be clustered based on time periods e.g., hourly, daily, or weekly data blocks. In these cases, remote primary control unit 128 may be configured to continuously generate structured data package 136 for a specific time interval. In other cases, if facility spans multiple locations, plurality of unstructured inputs 124 may be clustered based on geographic identifier 132 as described above.

With continued reference to FIG. 1, in some embodiments, one or more data entries, data blocks, or data clusters of structured data package 136 may be hashed, creating a digital fingerprint of structured data package 136. Remote primary controller 128 may be configured to produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

With continued reference to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original data to be hashed will change the resulting hash so extensively that the original hash and the new hash appear uncorrelated to each other. A degree of security of a hash function in practice may depend both on the hash function itself and on characteristics of the data and/or digest used in the hash function. For example, where a data entry within structured data package 136 is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of structured data package 136 may be augmented by increasing the length or potential length of each data entry, data block/cluster, or by implementing a protocol whereby one or more randomly selected strings or sets of additional unstructured inputs are added to the structured data package 136, rendering a dictionary attack significantly less effective.

With continued reference to FIG. 1, generating structured data package 136 may include adding secure timestamp generated based on the current time of master clock as described above that is recorded in a hash chain. In an embodiment, a hash chain includes a series of hashes, each produced from an unstructured input containing a current time stamp (i.e., current at the moment the receipt of such input or hash is created) and the previously created hash; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received plurality unstructured inputs 124 are locally processed at the secondary control unit 120 by a one-way function, e.g. a hash function as described above, and this hashed output data may be sent to a timestamping authority (TSA). The use of secure timestamps as described herein may enable system 100 as described herein to instantiate attested time (i.e., the property that remote primary control unit 128 incorporating a master clock may hash data, e.g., plurality of unstructured inputs 124, along with the local timestamp of secondary control unit 120). Attested time may additionally incorporate attested identity, attested device architecture and other pieces of information identifying properties of the attesting device. In one embodiment, secure timestamp is generated by a trusted third party (TTP) that appends a timestamp to structured data package 136, applies the TSA private key to sign the hashed output data concatenated to the timestamp, and returns this signed, a.k.a. trusted timestamped data back to the listener device. Alternatively, or additionally, one or more additional participants, such as other verifying nodes within the network, may evaluate secure timestamp, or other party generating secure timestamp and/or perform threshold cryptography with a plurality of such parties, each of which may have performed an embodiment of method to produce a secure timestamp. In an embodiment, remote primary control unit 128 or other parties authenticating digitally signed assertions, devices, and/or inputs (e.g., user credentials) may perform authentication at least in part by evaluating timeliness of entry and/or generation data as assessed against secure timestamp.

With continued reference to FIG. 1, In an embodiment, processing plurality of unstructured inputs 124 may include classifying plurality of unstructured inputs 124 into a configuration category 144 and generating structured data package 136 by structuring plurality of unstructured inputs 124 as a function of the classified configuration category 144. As used in this disclosure, a "configuration category" is a high-level operational directive or strategy. In some cases, configuration category 144 may include an overview or generalized perspective that focuses on broader aspect rather than detailed, specific elements. In a non-limiting example, configuration category 144 may be configured as an "action-oriented guidance" for secondary control units 120 and plurality of service units 104, for example, and without limitation, each configuration category may include, or at least be associated with a set of recommended actions or operational adjustments 148. An "operational adjustment," for the purpose of this disclosure, are changes or modifications made to the processes, procedures, or functioning of corresponding service unit. In one or more embodiment, operational adjustment 148 may include implementable (programming) code instructing secondary control unit how to respond or adapt based on structured data package 136. Exemplary operational adjustments are described in further detail below.

With continued reference to FIG. 1, in some cases, configuration category 144 may include one or more diagnostic data elements, prognostic data elements, or both, wherein the "diagnostic element" within configuration category 144 may include at least an identification and analysis of existing issues or anomalies present in plurality of unstructured inputs 124, while the "prognostic data element" within configuration category 144 may include a prediction of future system states, potential failures, maintenance needs, and/or the like. In an embodiment, processing plurality of unstructured inputs 124 may include analyzing, for example, and without limitation, operational parameters 116, sensor readings, and/or the like to detect deviations from a threshold operating condition. Historical operational parameters, sensor readings, and/or any other data as described herein may be used to forecast, for example, and without limitation, future conditions, likelihood of equipment failures, and/or the like using trend analysis and/or predictive modeling using one or more machine learning models as described in further detail below. For example, and without limitation, configuration category 144 may include one or more indicators (i.e., diagnostic data elements) identifying a malfunctioning dryer unit based on abnormal temperature readings and increased cycle times. For another example, and without limitation, remote primary control unit 128 may be configured to analyze patterns in the wear of brushes in washing units to predict when they will likely need replacement (i.e., prognostic data element), well before they fail. In some cases, both diagnostic data element and prognostic data element within configuration category 144 may trigger a maintenance check of corresponding service units.

With continued reference to FIG. 1, in a non-limiting example, one or more diagnostic and prognostic data elements of configuration category 144 may indicate a high-level strategic decision rather than granular operational details e.g., specific changes or modifications that are required by secondary control unit 120. In some cases, one or more diagnostic and prognostic data elements of configuration category 144 may provide a framework or overall approach within which specific tasks may be executed by secondary and tertiary control units 160 as described in further detail below. In a non-limiting example, structured data package 136 may facilitate decentralized decision making i.e., while remote primary control unit 128 set one or more configuration categories, the remote primary control unit 128 may empower connected secondary control units 120 of plurality of service units 104 to develop and implement specific, localized response e.g., operational adjustment 148. Examples of configuration categories 144 may include, without limitation, preventive maintenance, operational efficiency optimization, emergency response, and/or the like as described in more detail below.

With continued reference to FIG. 1, in a non-limiting embodiment, remote primary control unit 128 may determine configuration category 144 as "preventive maintenance" based on certain structured data package 136, wherein such configuration category may involve one or more operational adjustments 148 aimed at preventing equipment failures before they occur. In a non-limiting example, remote primary control unit 128 may identify preventive maintenance configuration category when one or more data entries, data blocks, or data clusters indicting a certain degree of wear and tear (exceeding a pre-defined threshold) or nearing the end of on-record lifecycle of certain components. For instance, and without limitation, if plurality of unstructured inputs include sensor data from a car wash service unit shows that water pumps are vibrating beyond normal threshold, remote primary control unit 128 may classify this as a preventive maintenance need, prompting secondary control unit to schedule maintenance for the pumps. In another non-limiting embodiment, remote primary control unit 128 may determine configuration category 144 as "operational efficiency optimization" based on certain structured data package 136, wherein such configuration category may focus on improving the overall efficiency of operations. In some cases, operational adjustments 148 such as, without limitation, reconfiguration of existing processes and/or operational parameters, reducing resource consumptions, throughput enhancement, and/or the like may be associated with operational efficiency optimization configuration category. Operational efficiency optimization configuration category may be selected when remote primary control unit 128 detect data showing suboptimal resource use or prolonged service time. In a non-limiting example, if plurality of unstructured inputs shows that certain car wash cycles are taking longer than average, consuming extra water and/or electricity, remote primary control unit 128 may initiate operational efficiency optimization configuration category to adjust the operational parameters e.g., cycle parameters for improved service efficiency. In some cases, remote primary control unit 128 may determine configuration category 144 as "emergency response" based on certain structured data package 136, for example, and without limitation, structured data package containing data indicative of one or more emergency situations, on-site incidents, system errors, or device failure such as sudden equipment shutdown, malfunction, safety system trigger, and/or any other unplanned events that require immediate actions. In a non-limiting example, if a chemical leak is detected in a service unit, remote primary control unit 128 may classify this as an emergency response situation, instructing secondary control unit to initiate emergency protocols, such as shutting shown related service units in affected area and alerting maintenance staff. Additionally, or alternatively, other exemplary embodiment of configuration category 144 may further include, without limitation, quality assurance (QA), unit upgrades, customer relationship management (CRM), and/or the like. As a person skilled in the art, upon reviewing the entirety of this disclosure, will be aware the variety of configuration categories and their importance in larger networked system as described herein.

With continued reference to FIG. 1, in some cases, system 100 may perform determinations, classification, and/or analysis steps, methods, processes, or the like for the purposes of this disclosure using machine-learning processes. A "machine-learning process," as used in this disclosure, is a process that automatically uses a body of data known as "training data" and/or a "training set" (described further below in this disclosure) to generate an algorithm that will be performed by, for example, remote primary control unit 128 and/or secondary control unit 120 to produce outputs given data as described herein as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, in one or more embodiments, remote primary control unit 128 may implement a machine learning module configured to generate one or more machine learning models using one or more machine learning algorithms to determine configuration category 144. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from one or more databases as described in further detail below, or even be provided by end-user. In a non-limiting example, machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In a further embodiment, training data may include previous outputs such that one or more machine learning models iteratively produces outputs.

With continued reference to FIG. 1, in a non-limiting embodiment, remote primary control unit 128 may be configured to classify plurality of unstructured inputs 124 or structured data packages into a configuration category 144 such as, without limitation, preventive maintenance, operational efficiency optimization, emergency response, or any other configuration category as listed above. In some cases, classifying plurality of unstructured inputs 124 or structured data packages may include training a configuration category classifier, such as any classifier as described below with reference to FIG. 3, using configuration category training data, wherein the configuration category training data may include a plurality of example unstructured inputs or structured data packages correlated to a plurality of example configuration categories, and classifying plurality of unstructured inputs 124 or structured data packages into the configuration category using the trained configuration category classifier. In some cases, configuration category training data may also include plurality of example operational parameter and/or example additional unstructured inputs examples correlated to plurality of example configuration categories. Additionally, or alternatively, remote primary control unit 128 may configure machine learning module to iteratively train configuration category classifier and/or any other machine learning models as described herein based on classified configuration category 144 to improve its predictive accuracy, for example, and without limitation, outputs of configuration category classifier may be added to configuration category training data to generate a new set of training data. Configuration category classifier may be retrained using the new set of training data.

With continued reference to FIG. 1, in some embodiments, generating structured data package 136 may further include determining a plurality of configuration settings 152 associated with configuration category 144 as a function of plurality of operational parameters 116 and incorporating the determined plurality of configuration settings 152 into structured data package 136 to facilitate plurality of operational adjustments 148 in secondary control units 120 of the plurality of service units 104. As used in this disclosure, "configuration setting" is a specific parameter or operational guideline that is determined and potentially applied within a particular configuration category to achieve a desired outcome. In a non-limiting example, plurality of configuration settings may be derived from processing of plurality of unstructured inputs 124, generating of structured data package 136, and/or classification of configuration category 144 as described above. In one or more embodiments, plurality of configuration settings 152 may include one or more actionable or configurable parameters or rules set by remote primary control unit 128 for secondary control units to implement. In a non-limiting example, plurality of configuration settings 152 may include detailed instructions or adjustments that operationalize high-level operational directive specified by configuration category 144 as described above. Exemplary configuration settings 152 may include, without limitation, machine settings, maintenance checks, part replacements, operational parameter adjustments, resource reallocation, safety protocols, operation rerouting, sensor calibrating, and/or the like.

With continued reference to FIG. 1, in some cases, plurality of configuration settings 152 may be determined using one or more lookup tables by mapping one or more unstructured inputs e.g., operational parameters, or in other cases, classified configuration category 144 to predefine configuration settings, wherein the "lookup table," for the purposes of this disclosure, is an array of data that maps input values to output values (e.g., configuration settings 152). In some cases, a lookup table may be used to replace a runtime computation with an array indexing operation. In a non-limiting example, if a sensor detects a certain temperature range, lookup table may be used to "lookup" a corresponding optimal drying time in the car wash system. In some cases, plurality of configuration setting 152 may also be determined using a rule engine configured to apply a set of user-defined rules to determine one or more appropriate configuration settings. In some cases, rules may be based on "if-then-else" logic, with at least one "condition" matched with one or more actions (e.g., configuration settings 152) and may handle more complex decision-making (on configuration settings 152) than lookup tables. In a non-limiting example, when structured data package 136 includes multiple factors e.g., water usage, cycle time, and customer feedback, rule engine may then be used to determine a configuration setting such as a most efficient resource allocation strategy. Additionally, or alternatively, machine learning module may be configured to generate one or more machine learning models configured to analyze historical and real-time data e.g., plurality of operational parameters 116, unstructured inputs 124 (and/or additional unstructured inputs), structured data package 136, and/or the like to identify one or more data patterns and make one or more predictions. In a non-limiting example, past maintenance record may be incorporated within structured data package 136 and remote primary control unit 128 may be configured to predict potential equipment failures along with current sensor readings and suggest preventive maintenance schedules using one or more generated machine learning models.

With continued reference to FIG. 1, in some cases, any data as described herein e.g., plurality of operational parameters 116, unstructured inputs 124 (including additional unstructured inputs 124), structured data package 136 (including configuration category 144 and configuration settings 152), and the like may be stored in one or more data stores 156. It should be noted that data store 156 may be accessed by any computing device such as, without limitation, remote primary control unit 128, secondary control unit 120, and the like. In a non-limiting embodiment, data store 156 may include a database. Data store 156 may be implemented, without limitation, as a relational database, a key-value retrieval database such as a NOSQL database, or any other format or structure for use as a database that a person skilled in the art would recognize as suitable upon review of the entirety of this disclosure. Data store 156 may alternatively or additionally be implemented using a distributed data storage protocol and/or data structure, such as a distributed hash table or the like. Data store 156 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in data store may store, retrieve, organize, and/or reflect data and/or records as used herein, as well as categories and/or populations of data consistently with this disclosure.

With continued reference to FIG. 1, in one or more embodiments, data store 156 may be communicatively connected to remote primary control unit 128 and/or secondary control units 120 and may implement a multi-master replication (in case where system 100 may include multiple remote primary control units which simultaneously or interchangeably take control or share control), wherein the "multi-master replication," for the purpose of this disclosure, is a database architecture where data as described herein may be written to, updated, or deleted from any of several database servers, and these changes may then be replicated to all other servers (i.e., secondary control units) in the network. Unlike traditional master-slave replication, wherein only "master" database may write and update data (with multiple slavers reading and replicating the data), multi-master replication may allow for multiple masters, each capable of handling write operations. In a non-limiting example, in a networked of secondary control units, each may employ multi-master replication, ensuring that if remote primary control unit 128 goes down, secondary control units may continue to operate without interruption. In some cases, data store 156 may implement multi-master replication as a load balancing mechanism which allows for a distribution of write and read loads across multiple servers, prevent any single control unit becoming a bottleneck. Additionally, or alternatively, for secondary control units 120 spread across different locations, implementation of multi-master replication may further ensure that each location may have its own database server, thereby reducing latency since each secondary control unit may interact with a local database server and ensures structured data package 136 remains accessible even if there's a connectivity issues with remote primary control unit 128. In some cases, local database server may include a database shard.

With continued reference to FIG. 1, remote primary control unit 128 is configured to transmit structured data package to secondary control units 120 of plurality of service units 104 for a selective implementation of a plurality of operational adjustments 148 based on structured data package 136. Transmission of structured data package 136 may be accomplished via a network communication in case where remote primary control unit 128 and secondary control units 120 arc interconnected through a network e.g., local area network (LAN), wide area network (WAN), or even a cloud-based network. In some cases, structured data package 136 may be transmitted through wireless network e.g., Wi-Fi, Bluetooth, cellular networks. In some cases, structured data package 136 may be transmitted over time via batch processing and/or real-time streaming; for instance, and without limitation, the transmission of structured data package 136 may be done in batches at scheduled intervals or in real-time. In some cases, real-time streaming may be used for time-sensitive data that requires immediate action, for example, when a collision is detected in service area. In a non-limiting example, secure data transfer protocol such as HTTPS (Hypertext Transfer Protocol Secure), FTPS (File Transfer Protocol Secure), or MQTT (Message Queuing Telemetry Transport) in IoT systems may be used to transmit structured data package 136 to secondary control units 120 of plurality of service units 104. Additionally, or alternatively, remote primary control unit 128 may send structured data package 136 through one or more APIS, which secondary control units access to retrieve structured data package 136. In some cases, structured data package 136 may include one or more geographic identifiers as described above. In these cases, remote primary control unit may be configured to only send structured data package 136 to secondary control units 120 associated with those geographic identifiers.

With continued reference to FIG. 1, in one or more embodiments, system 100 may be configured to implement secure protocol e.g., secure proof to ensure the security and integrity of structured data package 136 during transmission and processing. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 1, in a non-limiting example, secure proof as described herein may be implemented using a challenge-response protocol. In an embodiment, this may function as a one-time pad implementation; for instance, secondary control unit 120 may record a series of outputs ("responses") produced by a cryptographic algorithm or other trusted parties possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of structured data package 136; the key may be discarded for future use after a set period of time. In an embodiment, varied unstructured inputs include variations in operational parameters, such as sensor readings, user inputs, system alerts, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, remote primary control unit 128 may verify response by decrypting an encryption of challenge or of another data element using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, in some cases, secure proof may include a zero-knowledge proof, which may provide an output demonstrating possession of a secret while revealing none of the secret to a recipient of the structured data package 136 e.g., secondary control unit 120; zero-knowledge proof may be information-theoretically secure, meaning that corresponding service unit with infinite computing power would be unable to determine secret from structured data package 136. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 1, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 1, Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, transmitting structured data package 136 may include sending structured data package 136 (or command) to secondary control units 120 using a digital signature to authenticate the source of a "message" (i.e., provided element of data) and ensure that the message has not been altered during transmission. Such digital signature may act as a seal, verifying the message indeed comes from the legitimate remote primary control unit 128. A "digital signature," as used herein, includes a secure proof of possession of a secret by a signing device, as performed on the message. In some cases, message may include an encrypted mathematical representation of a file or other set of data e.g., structured data package 136 using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if structured data package 136 is well-designed and implemented correctly, any alteration of the structured data package 136 may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any data structure.

With continued reference to FIG. 1, in some embodiments, digital signatures may be combined with or incorporated in digital certificates to enhance the security and trustworthiness of communications within the networked system of plurality of service units 104. In one embodiment, a digital certificate is a data structure that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature. In a non-limiting example, digital certificate may be used to authenticate remote primary control unit 128. In some cases, certificate may confirm that remote primary control unit is authorized to issue such structured data package 136.

With continued reference to FIG. 1, in some embodiments, a third party such as a certificate authority (CA) may be available to verify that the possessor e.g., secondary control unit 120 of the private key is a particular entity; thus, if the certificate authority may be trusted, and the private key has not been stolen, the ability of an entity to produce a digital signature confirms the identity of the entity and links structured data package 136 to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that structured data package 136 has not been altered since the formation of the digital signature.

With continued reference to FIG. 1, additionally, or alternatively, remote primary control unit 128 may use one or more API endpoints to transmit structured data package 136 to secondary control units 120. In a non-limiting example, API endpoints may include one or more predefined URLs or URIs that represent various functionalities or data sources in the system. In some cases, secondary control unit 120 may access one or more endpoints to retrieve structured data package or send response data when needed. In one or more embodiments, system 100 as described herein may follows a request-response model, wherein the remote primary control unit 128 send a request (along with structured data package 136) to an API endpoint, and secondary control unit 120 may respond to the request, either by sending back data, an acknowledgment, or performing a required action e.g., one or more operational adjustments 148 as described below. Exemplary HTTP methods such as, without limitation, GET, POST, PUT, DELETE, may be used in such API interactions; for instance, and without limitation, primary control unit 128 may use a POST request to send structured data package 136 to a secondary control unit, or a GET request to retrieve plurality of unstructured inputs from secondary control unit as described above.

With continued reference to FIG. 1, as described herein, "selective implementation" means to targeted and specific application of plurality of operational adjustments 148 as described above based on the (analysis and directives contained within) structured data package 136 transmitted by remote primary control unit 128. In one or more embodiments, selective implementation of plurality of operational adjustments 148 may involve selecting and executing only those operational adjustments that are deemed relevant and necessary for specific secondary control unit or service unit, rather than applying a blanket approach across all secondary control units or service units. In other embodiments, secondary control unit 120 may implement none of plurality of operational adjustments 148. In some cases, one or more operational adjustments of plurality of operational adjustments 148 may be selected based on a manual input from user e.g., an operator. In some cases, secondary control unit 120 may be automatically discerned one or more operational adjustments 148 upon receipt of structured data package 136 using one or more machine learning process as described herein. In some cases, operational adjustments 148 may be embedded within structured data package 136 as described above. In some cases, secondary control unit 120 may be configured to identify one or more operational adjustments of plurality of adjustments as a function of configuration category specified within structured data package received from remote primary control unit 128.

With continued reference to FIG. 1, in a non-limiting embodiment, operational adjustment 148 may include modifications of operational parameters. Secondary control unit 120, upon implanting such operational adjustment may be configured to, for instance, changing the water pressure or temperature settings (in a custom wash) or projecting certain digital content at certain areas of the vehicle during the wash, according to plurality of configuration settings 152. In such embodiment, configuration settings 152 may include foam concentration requirement, display area, and/or the like as described in U.S. patent application Ser. No. 18/195,659, filed on May 10, 2023, and entitled "APPARATUS AND METHOD FOR DISPLAYING DIGITAL CONTENT ONTO A VEHICLE", which its entirety is all incorporated herein by reference. In another non-limiting example, operational adjustments may be selected and then implemented based on a verification datum or user authentication datum (i.e., proof of authenticity or identification of the user) such as any verification datum or user authentication datum as described in U.S. patent application Ser. No. 18/196,205 and U.S. patent application Ser. No. 18/196,494. In such embodiment, changes or modifications may need to be authorized or verified for one or more security, safety, or otherwise compliance purposes. Operational adjustments 148 may be contingent upon a successful verification or a positive identification of user's identity or authority. Additionally, or alternatively, in cases where service units 104 are spread across different geographic locations, modifications of operational parameters may be made based on local environmental conditions or regulations retrieved from trusted data sources using geographic identifier 132 listed in structured data package 136, for example, and without limitation, in areas with water scarcity, remote primary control unit 128 may send structured data package suggesting adjustments, or in other cases, secondary control unit 120 may be configured to reduce water usage specifically to service units in those regions accordingly. Further, in some cases, operational adjustment 148 may further include one or more adjustments to vehicle care command (i.e., an instruction that directs the operation of a service unit to perform vehicle care) as described in U.S. patent application Ser. No. 18/196,205.

With continued reference to FIG. 1, in one or more embodiments, secondary control unit 120 may be further configured to instruct one or more tertiary control units 160 communicatively connected to secondary control unit 120 to execute one or more operational adjustments e.g., modifications to one or more operational parameters recognizable by tertiary control units 160. As used in this disclosure, "tertiary control unit" is the lowest level in the hierarchy of the larger networked system as described herein. In a non-limiting example, tertiary control unit 160 may include a localized controller or processor that directly interfaces with and control individual components or processes within respective service unit. For instance, and without limitation, tertiary control unit 160 may include a microcontroller of a particular equipment that is managed by service unit and secondary control unit thereof. In some cases, when secondary control unit 120 identifies the need for one or more operational adjustments of plurality of operational adjustments 148 based on one or more analysis of structured data package 136, secondary control unit 120 may be configured to communicate such need to one or more corresponding tertiary control units 160. In these cases, selected operational adjustments may be conveyed as high-level directives i.e., configuration categories, which secondary control units interpret and translate into more specific instructions such as configuration settings and/or instructions of selected operational adjustments. Tertiary control units 160 may be responsible for direct control of specific operational parameters within their respective service units. This may include, without limitation, settings on machinery, adjustments in resource allocation, changes in process flows, and/or the like.

With continued reference to FIG. 1, in yet another non-limiting embodiment, operational adjustment 148 may also include equipment-specific adjustment. In some cases, different service unit may include varying types of equipment with distinct maintenance needs. In some instances, structured data package 136 may include one or more configuration settings 152 such as, without limitation, specific maintenance schedules or protocols tailored to the type of equipment each service unit possesses. In one or more embodiments, structured data package 136 may indicate increased wear or potential issues in certain equipment of service units, one or more operational adjustment such as, without limitation, scheduling preventive maintenance may be determined at secondary control unit based on such structured data package 136. In a non-limiting example, secondary control unit 120 may automatically generate, as a function of structured data package 136, a maintenance ticket and adjust the service unit's operation schedule accordingly to accommodate the maintenance window. In yet another non-limiting embodiment, operational adjustments 148 may also include, in case of an emergency or safety issue raised by configuration category 144 such as a chemical spill or equipment malfunction, shutting down affected unit, activating one or more unit's safety features, alerting human supervisors, and/or the like. Other exemplary operational adjustments may include, without limitation, implementing energy saving measures during peak hours by reducing lighting in non-essential areas or optimizing the user of equipment, altering service process based on identified trend for improved customer experience, download and install specific version or updates of software to improve performance or add new features, adjust the mix or amount of cleaning chemicals used based on vehicle data, and/or the like. As a person skilled in the art, upon reviewing the entirety of this disclosure, will be aware of various operational adjustments may be selected and then implemented by secondary control unit 120 as described herein.

With continued reference to FIG. 1, in a non-limiting embodiment, data store 156 may implement one or more aspects of immutable record keeping. For instance, and without limitation, every transaction (e.g., structured data package 136 transmission), or operational adjustments 148 may be recorded on an immutable sequential listing (e.g., a block on blockchain). An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered. In such an embodiment, structured data package 136 may not be stored in a single central repository but is distributed across multiple nodes. Such decentralization may enhance system's resilience against attacks and failures as there is no single point of failure. In one or more embodiments, certain operational adjustments may be automatically selected and then implemented using smart contracts based on one or more pre-defined conditions, for example, and without limitation, if structured data package 136 indicate the need for maintenance after a certain number of operational hours, a smart contract may automatically initiate maintenance protocol. Additionally, or alternatively, every stakeholder in the system may verify actions taken and data recorded on immutable sequential listing. Immutable sequential listing is described in further detail below with reference to FIG. 4.

With continued reference to FIG. 1, in some cases, system 100 as described herein may further include a display device. As used in this disclosure, a "display device" refers to an electronic device that visually presents information to the entity. In some cases, display device may be configured to project or show visual content generated by computers, video devices, or other electronic mechanisms. In some cases, display devices may include, without limitation, a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data and/or visual elements as listed above in various formats such as, textural, graphical, video among others, in either monochrome or color. In one or more embodiments, transmitting structured data package 136 may include displaying structured data package 136 at display device using a visual interface. In some cases, both remote primary control unit 128 and secondary control units may be connected to display device.

With continued reference to FIG. 1, as used in this disclosure, a "visual interface" is a digital display that presents information, options, interactive elements to users in an intuitive and visually appealing manner. In some embodiments, visual interface may include at least an interface element. As used in this disclosure, "at least an interface element" is a portion of visual interface. In a non-limiting example, at least an interface element may include, without limitation, a button, a link, a checkbox, a text entry box and/or window, a drop-down list, a slider, or any other interface element that may occur to a person skilled in the art upon reviewing the entirety of this disclosure. In some embodiments, at least an interface element may include an event handler. An "event handler," as used in this disclosure, is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, in some cases, event handler may include a cross-session state variable. As used herein, a "cross-session state variable" is a variable recording data entered on secondary control unit 120 during a previous session. Such data may include, for instance, previously entered text, previous selections of one or more elements as described above, or the like. For instance, and without limitation, cross-session state variable data may represent a request (of structured data package 136) a user entered in a past session. Cross-session state variable may be saved using any suitable combination of client-side data storage on remote device and server-side data storage connected to remote primary control unit 128. In some cases, structured data package 136 may be saved wholly or in part as a "cookie" which may include data or an identification of secondary control unit 120 to prompt provision of cross-session state variable by remote primary control unit 128, which may store the data in data store 156 as described above. In some cases, cross-session state variable may include at least a prior session datum. A "prior session datum" may include any element of data that may be stored in a cross-session state variable. In an embodiment, visual interface may be configured to display the at least a prior session datum, for instance and without limitation auto-populating user query data from previous sessions. In a non-limiting example, visual interface may include structured data package 136, user selected operational adjustments 148, and any relevant data related to implementation of the selected operational adjustments. Advantageously, secondary control unit 120 may store previous selections such that a user does not have to request for structured data package 136 during each visit.

With continued reference to FIG. 1, in a non-limiting example, visual interface may include at least an interface element, for example, an image box, wherein the image box may be configured to display structured data package 136 generated and transmitted by remote primary control unit 128 as described above. In some cases, event handler may transmit structured data package from remote primary control unit 128 to secondary control unit 120. In a non-limiting example, structured data package 136 may be hidden on visual interface. Visual interface may include one or more interface elements, for example, a button with an event handler configured to request structured data package 136 and/or send plurality of unstructured inputs 124. In some cases, user may visually observe structured data package 136 via visual interface to interpret the data and identify one or more configuration settings 152 and/or operational adjustments 148. In other cases, user may be able to edit, modify, or otherwise manipulate structured data package 136 via visual interface using plurality of interface elements.

With continued reference to FIG. 1, it should be noted that while examples provided in this disclosure, such as vehicle care devices, vehicle care (operations), and the like are specific to automotive service industry, system 100 and methods as described herein are not limited to this field alone; for instance, and without limitation, system 100 and methods as described herein may be adapted for use in manufacturing facilities, realm of smart building management (where various systems such as HVAC, lighting, and security may require coordinated control), agriculture, or event healthcare where principles of data-driven decision-making specific tiered control structure as described below may offer significant benefits in terms of operational efficiency, resource optimization, predictive maintenance, and/or the like.

Figure 2:
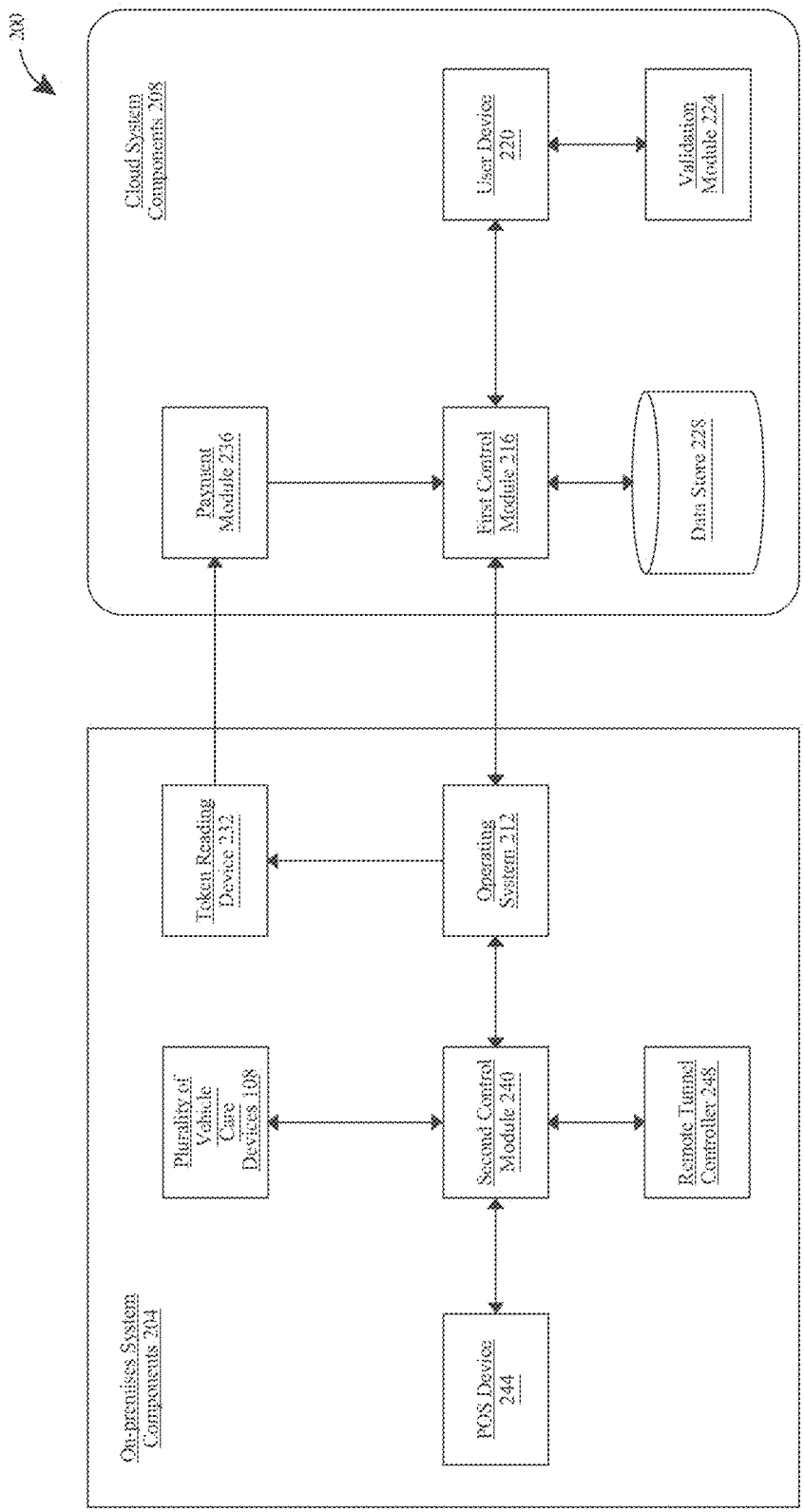
FIG. 2 is a block diagram illustrating a high-level system architecture of system for managing and controlling a network of distributed service units.

Referring now to FIG. 2, a high-level system architecture 200 of system 100 for managing and controlling a network of distributed service units is illustrated. System architecture 200 may include plurality of on-premises system components 204. As used in this disclosure, "on-premises system components" are components (e.g., computing infrastructure, software, or hardware) that are installed, hosted, and maintained within physical location of vehicle care site. In a non-limiting example, service unit and components thereof may be on-premises system components. In an embodiment, vehicle care site may be responsible for the management, maintenance, security, and operation of plurality of on-premises system components 204. Additionally, or alternatively, system architecture 200 may include plurality of cloud system components 208. As used in this disclosure, "cloud system components" are components (e.g., computing infrastructure, software, or hardware) that are installed, hosted, and maintained on cloud environment as described above with reference to FIG. 1. In a non-limiting example, remote primary control unit may be implemented as a cloud system component.

With continued reference to FIG. 2, system architecture 200 may include an operating system 212. As used in this disclosure, an "operating system" is a fundamental software that manages and controls various system components as described in this disclosure such as secondary control unit 120, plurality of service units 104, and/or the like. In an embodiment, operating system 212 may be responsible for executing any processing steps as described in this disclosure. In a non-limiting example, operating system 212 may allocate system resources (e.g., processing power, memory, and/or storage) among various system components, manage the implementation of operational adjustments 148, and coordinating the communication between primary control unit and secondary control units.

With continued reference to FIG. 2, operating system 212 may be communicated with a first control module 216, wherein the first control module 216 (e.g., remote primary control unit 128) may be a control unit hosted on cloud environment. In some cases, one or more user device 220 may be communicate with first control module 216. A "user device," for the purpose of this disclosure, is any additional computing device used by user to access and/or interact with digital content or services, such as a mobile device, laptop, desktop computer, or the like. In a non-limiting embodiment, user device 220 may be a computer and/or smart phone operated by a user in a remote location. In a non-limiting example, user may use user device 220 for user authentication to gain access to vehicle care site and/or plurality of vehicle care devices within the vehicle care site. User device 220 may allow user to enter user input containing, for example, one or more selection of operational adjustments 148. In some cases, user input may be verified using a validation module 224, wherein the "validation module," for the purpose of this disclosure, is a component responsible for validating and/or verifying a given credential, a certification, or otherwise an entitlement. In a non-limiting example, validation module 224 as described herein may be consistent with any validation module described in U.S. patent application Ser. No. 18/196,205. In some cases, validation module 224 may be a cloud system component; for instance, and without limitation, validation module 224 may include a cloud identify provider (IDP) configured to delivers identity and access management (IAM) functionality as a SaaS. First control module 216 may be communicate with data store 228, such as any data store as described herein, to enable validation module 224 to access previously generated structured data package or other data. In this case, data store 228 may include a cloud storage as described above.

With continued reference to FIG. 2, operating system 212 may communicate with one or more token reading device 232 via Bluetooth Low Energy (BLE). In a non-limiting example, token reading device 232 may include a card reader, wherein the card reader is a device used to read and extract data from various types of cards, such as, without limitation, credit cards, debit cards, smart cards, magnetic strip cards, and/or the like. In a non-limiting example, token reading device 232 may be configured to process an electronic payment transaction, enabling access to plurality of service units and/or vehicle cares. Token reading device 232 may be communicate with a payment module 236, wherein the payment module 236 is a system component that handles the processing of any payment transaction within the system. In some cases, payment module 236 may be a cloud system component; for instance, and without limitation, payment module 236 may include a set of APIs configured for processing online payment. APIs may include a third-party ($3^{rd}$ party) payment processing APIs. In a non-limiting example, first control module 216 may be configured to manage membership-related data within plurality of user profiles (e.g., create/subscribe to a new membership, retrieving membership status, updating membership status, deleting/unsubscribe membership) via payment module 236 communicatively connected to first control module 216 by utilizing one or more STRIPE APIs. User profile may include any user profile as described in U.S. patent application Ser. No. 18/196,494. Payment module 236 and payment processing process may be consistent with any payment module 220 and processing steps as described in U.S. patent application Ser. No. 18/196,238.

With continued reference to FIG. 2, additionally, or alternatively, operating system 212 may communicate with a second control module 240, wherein the second control module 224 may be a control module hosted within vehicle care site (i.e., on-premises control module). In a non-limiting example, second control module 240 may include secondary control unit 120 configured to control plurality of on-site devices (i.e., on-premises system components 204) such as, without limitation, plurality of vehicle care devices 108, point-of-sale (POS) devices 244. In some cases, POS devices 244 may include, without limitation, cashdrawer, receipt printer, and/or the like. In some cases, secondary control unit may be configured to communicate with another secondary control unit. In a non-limiting example, second control module 240 may be configured to communicate with a remote tunnel controller (RTC) 248, wherein the RTC 248 is a device or software application that allows for remote monitoring and control of a car wash tunnel (service unit). RTC 248 may enable second control module 240 to monitor and manage the car wash tunnel from a central location, rather than needing to be physically present on-site. In some cases, RTC 248 may be used to monitor plurality of operational parameters 116 such as, without limitation, status of plurality of service units, vehicle throughput, chemical usage, and the like.

Figure 3:
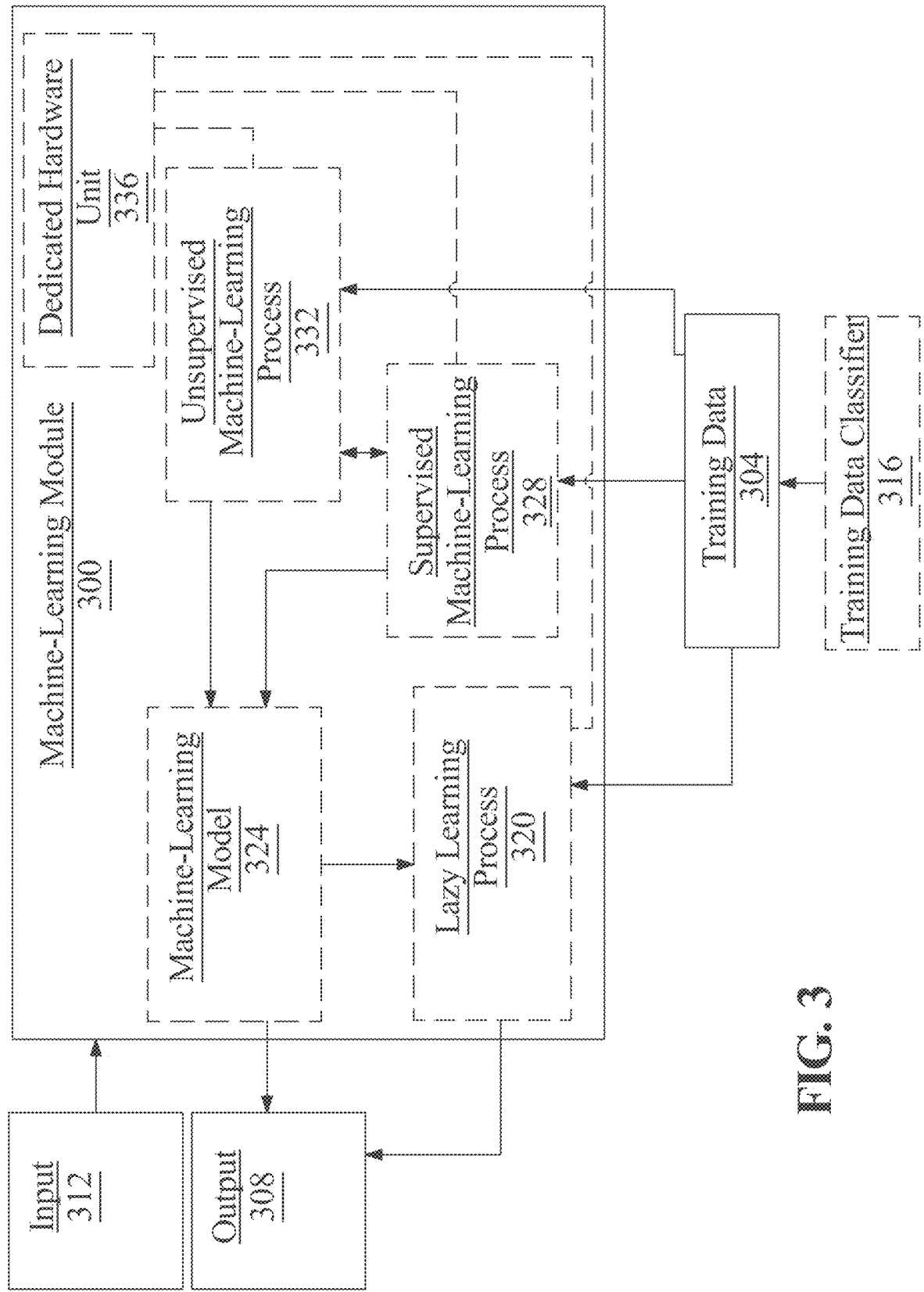
FIG. 3 illustrates a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

With continued reference to FIG. 3, alternatively, or additionally, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example training data may include a plurality of example unstructured inputs correlated to a plurality of example configuration categories as described above with reference to FIG. 1.

With continued reference to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

With continued reference to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

With continued reference to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, santization may include utilizing algorithms for identifying duplicate entries or spell-check algorithms.

With continued reference to FIG. 3, as a non-limiting example, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

With continued reference to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context.

As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

With continued reference to FIG. 3, in some embodiments, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to cleanup side-effects of compression.

With continued reference to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

With continued reference to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

With continued reference to FIG. 3, alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include plurality of example unstructured inputs as described above as inputs, plurality of example configuration categories as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With continued reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

With continued reference to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

With continued reference to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

With continued reference to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

With continued reference to FIG. 3, redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

With continued reference to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
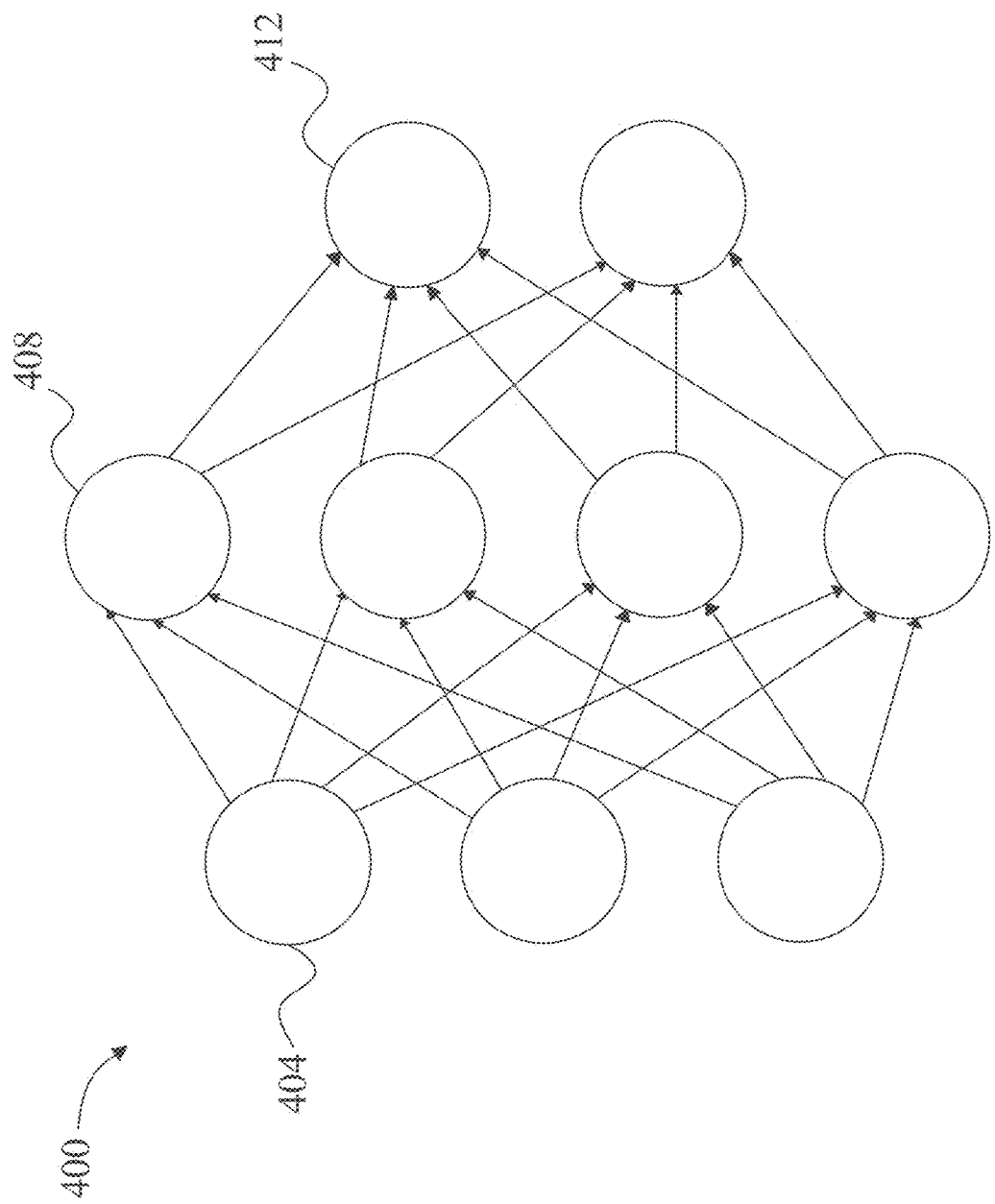
FIG. 4 illustrates a diagram of an exemplary nodal network.

Referring now to FIG. 4, an exemplary embodiment of neural network 400 is illustrated. A neural network 400, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
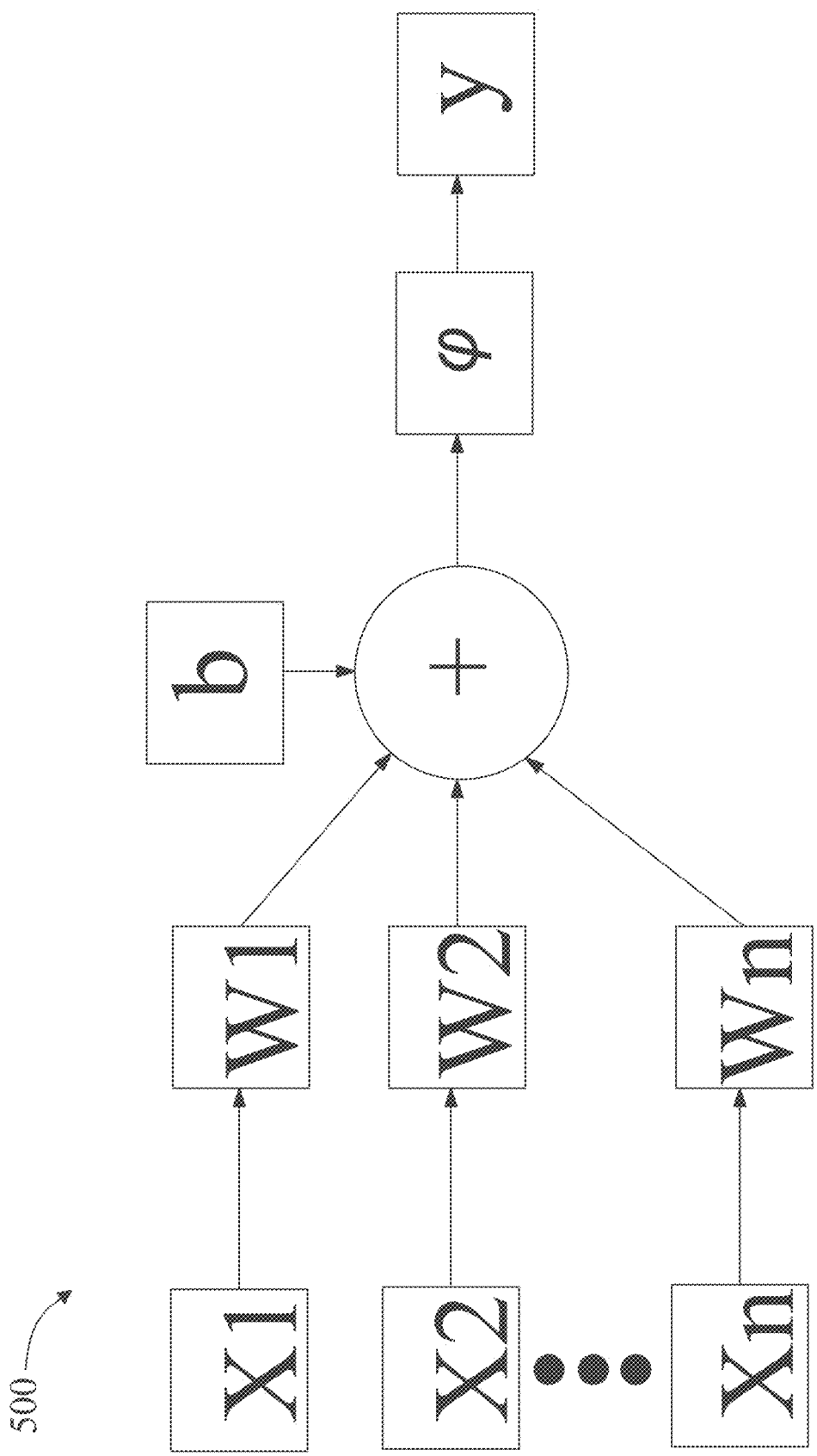
FIG. 5 illustrates a block diagram of an exemplary node.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $$f(x) = a\left(1 + \tanh\left(\sqrt{2/\pi}(x + bx^r)\right)\right)$$

for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
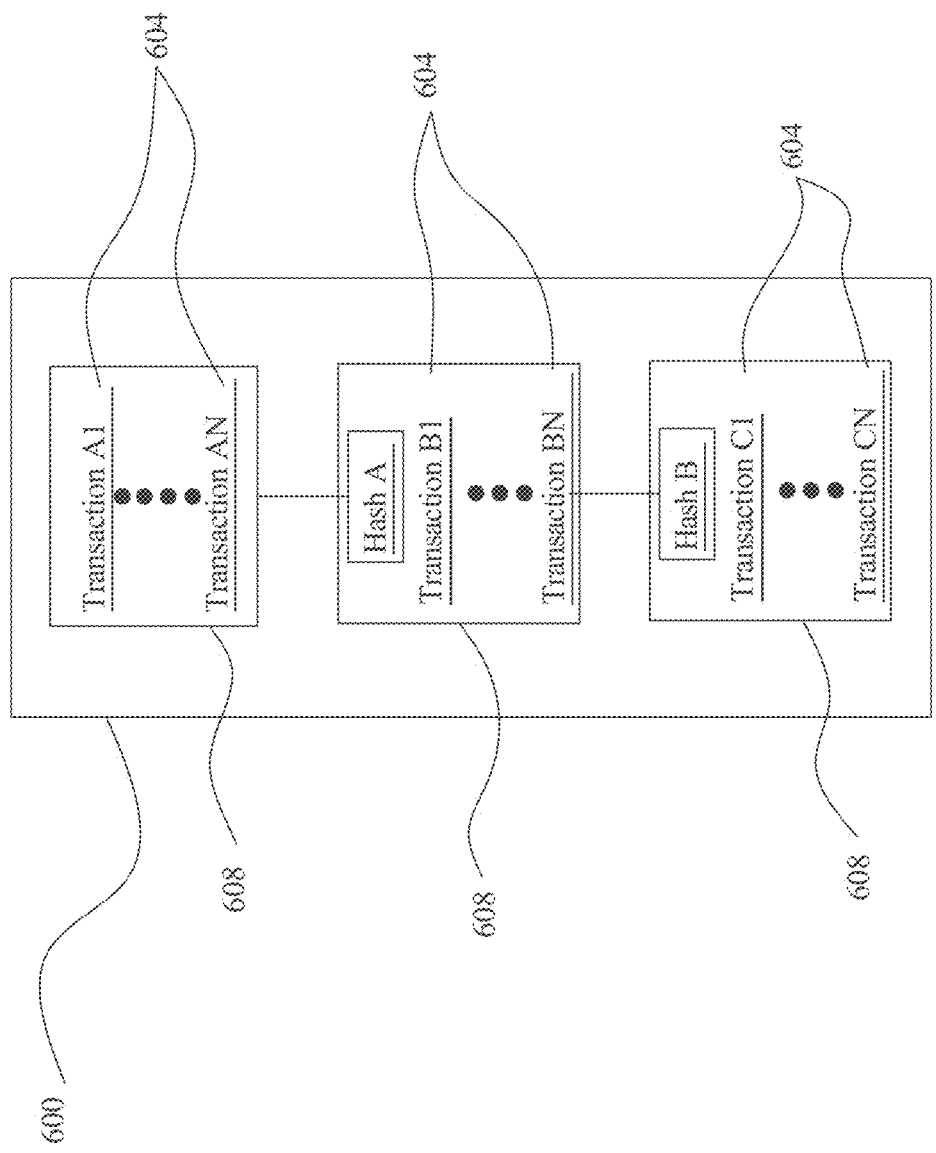
FIG. 6 is a block diagram of an exemplary immutable sequential listing.

Referring now to FIG. 6, an exemplary embodiment of an immutable sequential listing 600 is illustrated. Data elements are listed in immutable sequential listing 600; data elements may include any form of data, including textual data, image data, encrypted data, cryptographically hashed data, and the like. Data elements may include, without limitation, one or more at least a digitally signed assertion. In one embodiment, a digitally signed assertion 604 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 604. In an embodiment, collection of textual data states that the owner of a certain transferable item represented in a digitally signed assertion 604 register is transferring that item to the owner of an address. A digitally signed assertion 604 may be signed by a digital signature created using the private key associated with the owner's public key, as described above.

With continued reference to FIG. 6, a digitally signed assertion 604 may describe a transfer of virtual currency, such as crypto-currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 604 may describe the transfer of a physical good; for instance, a digitally signed assertion 604 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 604 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

With continued reference to FIG. 6, in one embodiment, an address is a textual datum identifying the recipient of virtual currency or another item of value in a digitally signed assertion 604. In some embodiments, address is linked to a public key, the corresponding private key of which is owned by the recipient of a digitally signed assertion 604. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 604 may record a subsequent a digitally signed assertion 604 transferring some or all of the value transferred in the first a digitally signed assertion 604 to a new address in the same manner. A digitally signed assertion 604 may contain textual information that is not a transfer of some item of value in addition to, or as an alternative to, such a transfer. For instance, as described in further detail below, a digitally signed assertion 604 may indicate a confidence level associated with a distributed storage node as described in further detail below.

With continued reference to FIG. 6, immutable sequential listing 600 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 600 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

With continued reference to FIG. 6, immutable sequential listing 600 may preserve the order in which the at least a posted content took place by listing them in chronological order; alternatively or additionally, immutable sequential listing 600 may organize digitally signed assertions 604 into sub-listings 608 such as "blocks" in a blockchain, which may be themselves collected in a temporally sequential order; digitally signed assertions 604 within a sub-listing 608 may or may not be temporally sequential. The ledger may preserve the order in which at least a posted content took place by listing them in sub-listings 608 and placing the sub-listings 608 in chronological order. The immutable sequential listing 600 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 600 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

With continued reference to FIG. 6, in some embodiments, immutable sequential listing 600, once formed, may be inalterable by any party, no matter what access rights that party possesses. For instance, immutable sequential listing 600 may include a hash chain, in which data is added during a successive hashing process to ensure non-repudiation. Immutable sequential listing 600 may include a block chain. In one embodiment, a block chain is immutable sequential listing 600 that records one or more new at least a posted content in a data item known as a sub-listing 608 or "block." An example of a block chain is the BITCOIN block chain used to record BITCOIN transactions and values. Sub-listings 608 may be created in a way that places the sub-listings 608 in chronological order and link each sub-listing 608 to a previous sub-listing 608 in the chronological order so that any computing device may traverse the sub-listings 608 in reverse chronological order to verify any at least a posted content listed in the block chain. Each new sub-listing 608 may be required to contain a cryptographic hash describing the previous sub-listing 608. In some embodiments, the block chain contains a single first sub-listing 608 sometimes known as a "genesis block."

With continued reference to FIG. 6, the creation of a new sub-listing 608 may be computationally expensive; for instance, the creation of a new sub-listing 608 may be designed by a "proof of work" protocol accepted by all participants in forming the immutable sequential listing 600 to take a powerful set of computing devices a certain period of time to produce. Where one sub-listing 608 takes less time for a given set of computing devices to produce the sub-listing 608 protocol may adjust the algorithm to produce the next sub-listing 608 so that it will require more steps; where one sub-listing 608 takes more time for a given set of computing devices to produce the sub-listing 608 protocol may adjust the algorithm to produce the next sub-listing 608 so that it will require fewer steps. As an example, protocol may require a new sub-listing 608 to contain a cryptographic hash describing its contents; the cryptographic hash may be required to satisfy a mathematical condition, achieved by having the sub-listing 608 contain a number, called a nonce, whose value is determined after the fact by the discovery of the hash that satisfies the mathematical condition. Continuing the example, the protocol may be able to adjust the mathematical condition so that the discovery of the hash describing a sub-listing 608 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 608 according to the protocol is known as "mining." The creation of a new sub-listing 608 may be designed by a "proof of stake" protocol as will be apparent to those skilled in the art upon reviewing the entirety of this disclosure.

With continued reference to FIG. 6, in some embodiments, protocol also creates an incentive to mine new sub-listings 608. The incentive may be financial; for instance, successfully mining a new sub-listing 608 may result in the person or entity that mines the sub-listing 608 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 608 Each sub-listing 608 created in immutable sequential listing 600 may contain a record or at least a posted content describing one or more addresses that receive an incentive, such as virtual currency, as the result of successfully mining the sub-listing 608.

With continued reference to FIG. 6, where two entities simultaneously create new sub-listings 608, immutable sequential listing 600 may develop a fork; protocol may determine which of the two alternate branches in the fork is the valid new portion of the immutable sequential listing 600 by evaluating, after a certain amount of time has passed, which branch is longer. "Length" may be measured according to the number of sub-listings 608 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 608 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 600 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 600.

With continued reference to FIG. 6, additional data linked to at least a posted content may be incorporated in sub-listings 608 in the immutable sequential listing 600; for instance, data may be incorporated in one or more fields recognized by block chain protocols that permit a person or computer forming a at least a posted content to insert additional data in the immutable sequential listing 600. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical cryptocurrency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 6, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 608 in a block chain computationally challenging; the incentive for producing sub-listings 608 may include the grant of new crypto-currency to the miners. Quantities of crypto-currency may be exchanged using at least a posted content as described above.

Figure 7:
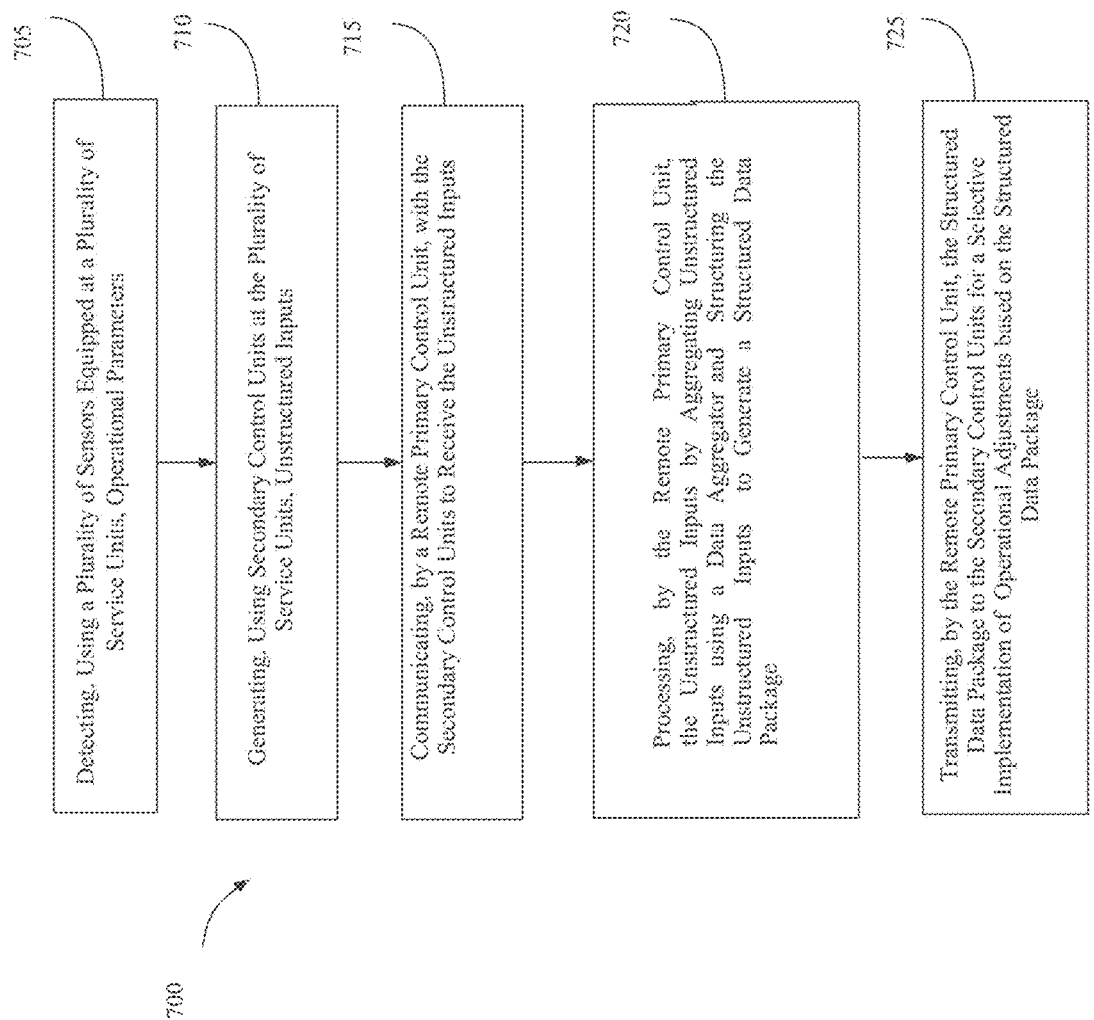
FIG. 7 is a flow diagram illustrating an exemplary embodiment of a method for managing and controlling a network of distributed service units.

Now referring to FIG. 7, a flow diagram of an exemplary embodiment of a method 700 for managing and controlling a network of distributed service units is illustrated. Method 700 includes a step 704 of detecting, using a plurality of sensors equipped at each service unit of the plurality of service units, a plurality of operational parameters. In some embodiments, the plurality of service units may include one or more vehicle care devices. In some embodiments, the plurality of operational parameters may include a plurality of engineering units pertaining to the vehicle care devices. This may be implemented, without limitation, as described above with reference to FIGS. 1-6.

With continued reference to FIG. 7, method 700 includes a step 710 of generating, using secondary control units at the plurality of service units, a plurality of unstructured inputs containing a plurality of digital signals related to the plurality of operational parameters detected by the plurality of sensors. In some embodiments, generating the plurality of unstructured inputs may include performing a preliminary data processing on the plurality of operational parameters. In some cases, the plurality of unstructured inputs further may include one or more additional inputs containing vehicle data. This may be implemented, without limitation, as described above with reference to FIGS. 1-6.

With continued reference to FIG. 7, method 700 includes a step 715 of communicating, by a remote primary control unit, with the secondary control units of the plurality of service units to receive the plurality of unstructured inputs. This may be implemented, without limitation, as described above with reference to FIGS. 1-6.

With continued reference to FIG. 7, method 700 includes a step 720 of processing, by the remote primary control unit, the plurality of unstructured inputs by aggregating the plurality of unstructured inputs using a data aggregator and structuring the plurality of unstructured inputs to generate a structured data package. In some embodiments, processing the plurality of unstructured inputs may further include classifying the plurality of unstructured inputs into a configuration category and generating the structured data package by structuring the plurality of unstructured inputs as a function of the classified configuration category. In some cases, classifying the plurality of unstructured inputs may include training a configuration category classifier using configuration category training data, wherein the configuration category training data includes a plurality of example unstructured inputs correlated to a plurality of example configuration categories, and classifying the plurality of unstructured inputs into the configuration category using the trained configuration category classifier. In some embodiments, generating the structured data package may include determining a plurality of configuration settings associated with the configuration category as a function of the plurality of operational parameters and incorporating the determined plurality of configuration settings into the structured data package to facilitate the plurality of operational adjustments in the secondary control units of the plurality of service units. In some cases, the configuration category comprises a preventive maintenance configuration category. This may be implemented, without limitation, as described above with reference to FIGS. 1-6.

With continued reference to FIG. 7, method 700 includes a step 725 of transmitting, by the remote primary control unit, the structured data package to the secondary control units of the plurality of service units for a selective implementation of a plurality of operational adjustments based on the structured data package. In some embodiments, the structured data package is designed for an API-level interaction between the remote primary control unit and the secondary control units of the plurality of service units. This may be implemented, without limitation, as described above with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
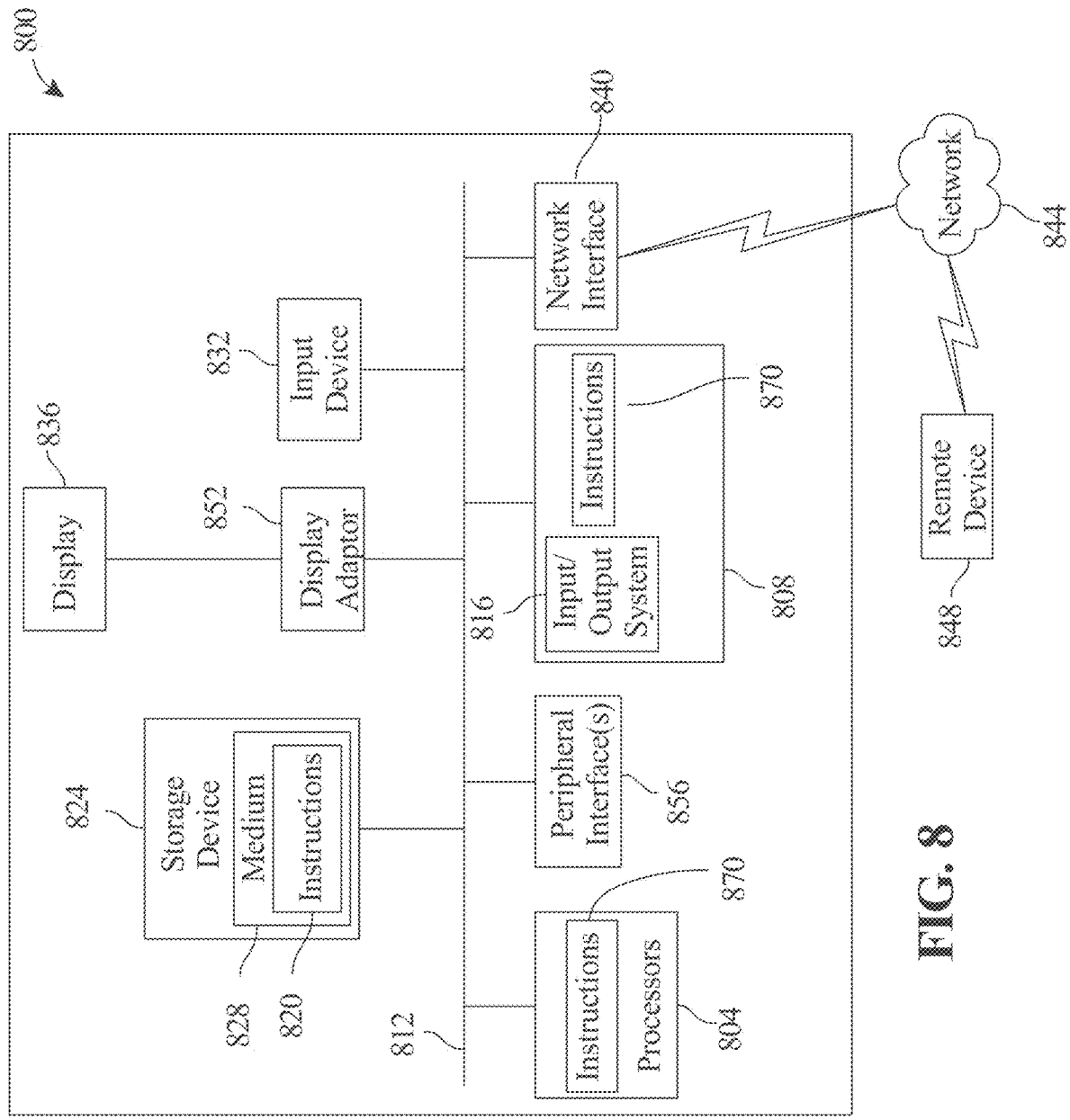
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for managing and controlling a network of distributed service units, the system comprises:
  a plurality of service units, wherein each service unit of the plurality of service units comprises:
    a plurality of sensors, wherein each sensor of the plurality of sensors is configured to detect a plurality of operational parameters of a carwash system; and
    a secondary control unit communicatively connected to the plurality of sensors, wherein the secondary control unit is configured to:
      generate a plurality of unstructured inputs, wherein the plurality of unstructured inputs comprises a plurality of digital signals associated with the plurality of operational parameters of the carwash system; and
  a remote primary control unit communicatively connected to the secondary control units of the plurality of service units, wherein the remote primary control unit is configured to:
    communicate with the secondary control units of the plurality of service units to receive the plurality of unstructured inputs;
    classify the plurality of unstructured inputs into a configuration category;
    process the classified plurality of unstructured inputs by:
      aggregating the plurality of unstructured inputs using a data aggregator; and
      structuring the plurality of unstructured inputs to generate a structured data package;
    communicate between the remote primary control unit and the secondary control unit using a data format for data exchange, wherein the secondary control unit processes the structured data before transmitting the structured data to the plurality of service units; and
    transmit the structured data package to the secondary control units of the plurality of service units; and
    implement a selection of a plurality of operational adjustments based on the structured data package.

2. The system of claim 1, wherein the plurality of service units comprises one or more vehicle care devices.

3. The system of claim 1, wherein the plurality of operational parameters comprises equipment health data.

4. The system of claim 1, wherein generating the plurality of unstructured inputs comprises:
  performing preliminary data processing on the plurality of operational parameters, wherein the preliminary data processing comprises a sequence of operations selected from a group of operations consisting of data filtering, data normalization, data compression, and data timestamping.

5. The system of claim 1, wherein the plurality of unstructured inputs further comprises one or more additional inputs containing vehicle data.

6. The system of claim 1, wherein processing the plurality of unstructured inputs further comprises:
  classifying the plurality of unstructured inputs into a configuration category; and
  generating the structured data package by structuring the plurality of unstructured inputs as a function of the classified configuration category.

7. The system of claim 6, wherein classifying the plurality of unstructured inputs comprises:
  training a configuration category classifier using configuration category training data, wherein the configuration category training data comprises a plurality of example unstructured inputs correlated to a plurality of example configuration categories; and
  classifying the plurality of unstructured inputs into the configuration category using the trained configuration category classifier.

8. The system of claim 6, wherein the generating the structured data package comprises:
  determining a plurality of configuration settings associated with the configuration category as a function of the plurality of operational parameters; and
  incorporating the determined plurality of configuration settings into the structured data package to facilitate the plurality of operational adjustments in the secondary control units of the plurality of service units.

9. The system of claim 6, wherein the configuration category comprises a preventive maintenance category.

10. The system of claim 1, wherein the structured data package is designed for an application programming interface (API)-level interaction between the remote primary control unit and the secondary control units of the plurality of service units.

11. A method for managing and controlling a network of distributed service units, the method comprises:
   detecting, using a plurality of sensors equipped at each service unit of a plurality of service units, a plurality of operational parameters of a carwash system;
   generating, using secondary control units at the plurality of service units, a plurality of unstructured inputs, wherein the plurality of unstructured inputs comprises a plurality of digital signals related to the plurality of operational parameters of the carwash system;
   communicating, by a remote primary control unit, with the secondary control units of the plurality of service units to receive the plurality of unstructured inputs;
   classifying the plurality of unstructured inputs into a configuration category;
   processing, by the remote primary control unit, the plurality of unstructured inputs by aggregating the plurality of unstructured inputs using a data aggregator and structuring the plurality of unstructured inputs to generate a structured data package;
   communicating between the remote primary control unit and the secondary control unit using a data format for data exchange, wherein the secondary control unit processes the structured data before transmitting the structured data to the plurality of service units; and
   transmitting, by the remote primary control unit, the structured data package to the secondary control units of the plurality of service units; and
   implementing a selection of a plurality of operational adjustments based on the structured data package.

12. The method of claim 11, wherein the plurality of service units comprises one or more vehicle care devices selected from the group consisting of vehicle wash units, vehicle drying units, waxing unit, and vending machines.

13. The method of claim 11, wherein the plurality of operational parameters comprises equipment health data.

14. The method of claim 11, wherein generating the plurality of unstructured inputs comprises:
   performing preliminary data processing on the plurality of operational parameters, wherein the preliminary data processing comprises a sequence of operations selected from a group of operations consisting of data filtering, data normalization, data compression, and data time-stamping.

15. The method of claim 11, wherein the plurality of unstructured inputs further comprises one or more additional inputs containing vehicle data.

16. The method of claim 11, wherein processing the plurality of unstructured inputs further comprises:
   classifying the plurality of unstructured inputs into a configuration category; and
   generating the structured data package by structuring the plurality of unstructured inputs as a function of the classified configuration category.

17. The method of claim 16, wherein classifying the plurality of unstructured inputs comprises:
   training a configuration category classifier using configuration category training data, wherein the configuration category training data comprises a plurality of example unstructured inputs correlated to a plurality of example configuration categories; and
   classifying the plurality of unstructured inputs into the configuration category using the trained configuration category classifier.

18. The method of claim 16, wherein the generating the structured data package comprises:
   determining a plurality of configuration settings associated with the configuration category as a function of the plurality of operational parameters; and
   incorporating the determined plurality of configuration settings into the structured data package to facilitate the plurality of operational adjustments in the secondary control units of the plurality of service units.

19. The method of claim 16, wherein the configuration category comprises a preventive maintenance category.

20. The method of claim 11, wherein the structured data package is designed for an application programming interface (API)-level interaction between the remote primary control unit and the secondary control units of the plurality of service units.

* * * * *